United States Patent
Wantland et al.

(10) Patent No.: US 10,901,577 B2
(45) Date of Patent: Jan. 26, 2021

(54) METHODS AND SYSTEMS FOR INPUT SUGGESTION

(71) Applicant: Google LLC, Mountain View, CA (US)

(72) Inventors: Tim Wantland, Bellevue, WA (US); Julian Odell, Kirkland, WA (US); Seungyeon Kim, New York, NY (US); Iulia Turc, Seattle, WA (US); Daniel Ramage, Seattle, WA (US); Wei Huang, Clyde Hill, WA (US); Kaikai Wang, Bellevue, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/037,418

(22) Filed: Jul. 17, 2018

(65) Prior Publication Data

US 2020/0026395 A1   Jan. 23, 2020

(51) Int. Cl.
*G06F 17/00* (2019.01)
*G06F 3/0482* (2013.01)
*G06F 3/0484* (2013.01)

(52) U.S. Cl.
CPC .......... *G06F 3/0482* (2013.01); *G06F 3/0484* (2013.01)

(58) Field of Classification Search
CPC .... G06F 3/0482; G06F 3/0484; G06F 3/0237; G06F 3/0488; G06F 9/54; G06F 3/04895; G06F 3/0481
USPC ....................................................... 715/765
See application file for complete search history.

(56) References Cited

U.S. PATENT DOCUMENTS

| | | | |
|---|---|---|---|
| 6,377,965 B1 | 4/2002 | Hachamovitch et al. | |
| 2009/0216690 A1* | 8/2009 | Badger | G06F 3/0237 706/11 |
| 2012/0290952 A1* | 11/2012 | Paluch | H04L 12/1818 715/758 |
| 2013/0326521 A1* | 12/2013 | Tsuda | G06F 16/951 718/100 |
| 2015/0172227 A1* | 6/2015 | Grove, II | H04L 51/32 709/206 |

(Continued)

FOREIGN PATENT DOCUMENTS

| | | |
|---|---|---|
| WO | WO2017/112796 | 6/2017 |
| WO | WO2017/123411 | 7/2017 |

OTHER PUBLICATIONS

International Search Report and Written Opinion for Application No. PCT/US2019/041579, dated Oct. 9, 2019, 16 pages.

*Primary Examiner* — Jason T Edwards
(74) *Attorney, Agent, or Firm* — Dority & Manning, PA

(57) ABSTRACT

The present disclosure is directed to input suggestion. In particular, the methods and systems of the present disclosure can: receive, from a first application executed by one or more computing devices, data indicating information that has been presented by and/or input into the first application; generate, based at least in part on the received data, one or more suggested candidate inputs for a second application executed by the computing device(s); provide, in association with the second application, an interface comprising one or more options to select at least one suggested candidate input of the suggested candidate input(s); and responsive to receiving data indicating a selection of a particular suggested candidate input of the suggested candidate input(s) via the interface, communicate, to the second application, data indicating the particular suggested candidate input.

20 Claims, 22 Drawing Sheets

(56) References Cited

U.S. PATENT DOCUMENTS

| | | | |
|---|---|---|---|
| 2015/0378581 A1* | 12/2015 | Dietz | G06F 3/0488 |
| | | | 715/769 |
| 2016/0008720 A1* | 1/2016 | Inukai | A63F 13/795 |
| | | | 463/29 |
| 2017/0180294 A1 | 6/2017 | Milligan et al. | |
| 2017/0261987 A1* | 9/2017 | Takahashi | B60W 50/10 |
| 2017/0308273 A1 | 10/2017 | Choi | |

* cited by examiner

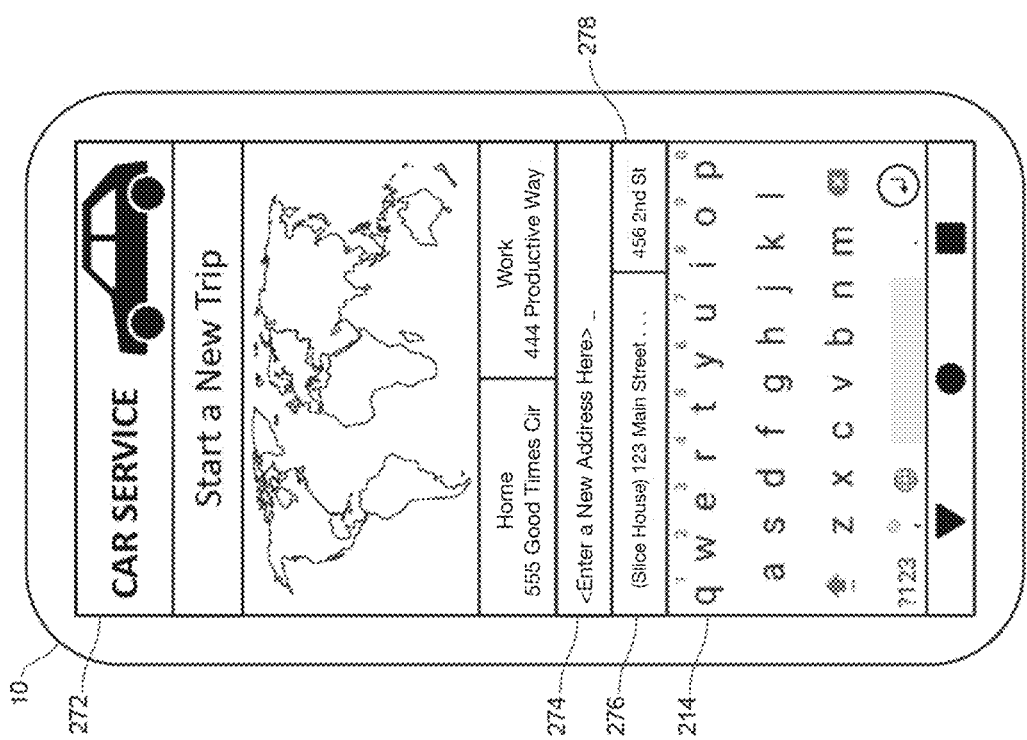

FIG. 3C

METHODS AND SYSTEMS FOR INPUT SUGGESTION

FIELD

The present disclosure relates generally to human-computer interaction. More particularly, the present disclosure relates to input suggestion.

BACKGROUND

Computing devices (e.g., desktop computers, laptop computers, tablet computers, smartphones, wearable computing devices, and/or the like) are ubiquitous in modern society. They can support communications between their users, provide their users with information about their environments, current events, the world at large, and/or the like. A myriad of different types of interfaces enable users to interact with such devices. For example, many devices include a touchscreen and provide an interface (e.g., including user-selectable options, a keyboard, and/or the like) configured to enable users to input information.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include receiving, by one or more computing devices and from a first application executed by the computing device(s), data indicating information that has been presented by and/or input into the first application. The method can also include generating, by the computing device(s), based at least in part on the data indicating the information that has been presented by and/or input into the first application, one or more suggested candidate inputs for a second application executed by the computing device(s). The generating can be performed without receiving user input via the first application indicating a desire to be able to utilize data based at least in part on the information in the second application, and the second application can be different and distinct from the first application. The method can further include providing, by the computing device(s) and in association with the second application, an interface comprising one or more options to select at least one suggested candidate input of the suggested candidate input(s). The method can further include, responsive to receiving data indicating a selection of a particular suggested candidate input of the suggested candidate input(s) via the interface, communicating, by the computing device(s) and to the second application, data indicating the particular suggested candidate input.

Another example aspect of the present disclosure is directed to a system. The system can include one or more processors and a memory storing instructions that when executed by the processor(s) cause the system to perform operations. The operations can include receiving data indicating information that has been presented by a first application executed by the system. The operations can also include receiving data indicating information that has been input into a second application executed by the system. The second application can be different and distinct from the first application. The operations can further include generating, based at least in part on the data indicating the information that has been presented by the first application and the data indicating the information that has been input into the second application, one or more suggested candidate inputs for the second application. The operations can further include providing, in association with the second application, an interface comprising one or more options to select at least one suggested candidate input of the suggested candidate input(s). The operations can further include, responsive to receiving data indicating a selection of a particular suggested candidate input of the suggested candidate input(s) via the interface, communicating, to the second application, data indicating the particular suggested candidate input.

A further example aspect of the present disclosure is directed to one or more non-transitory computer-readable media. The non-transitory computer-readable media can comprise instructions that when executed by one or more computing devices cause the computing device(s) to perform operations. The operations can include receiving data indicating information that has been presented by and/or input into an application executed by the computing device(s). The operations can also include generating, based at least in part on the data indicating the information that has been presented by and/or input into the application, one or more suggested candidate inputs for the application. The suggest candidate input(s) can include a suggested candidate input comprising metadata determined based at least in part on an entity associated with the suggested candidate input. The operations can further include providing, in association with the application executed by the computing device(s), an interface comprising one or more options to select at least one suggested candidate input of the suggested candidate input(s). The at least one suggested candidate input can include the suggested candidate input comprising the metadata determined based at least in part on the entity associated with the suggested candidate input.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 3A-D depict additional example GUIs according to example embodiments of the present disclosure;

DETAILED DESCRIPTION

Figure 1:
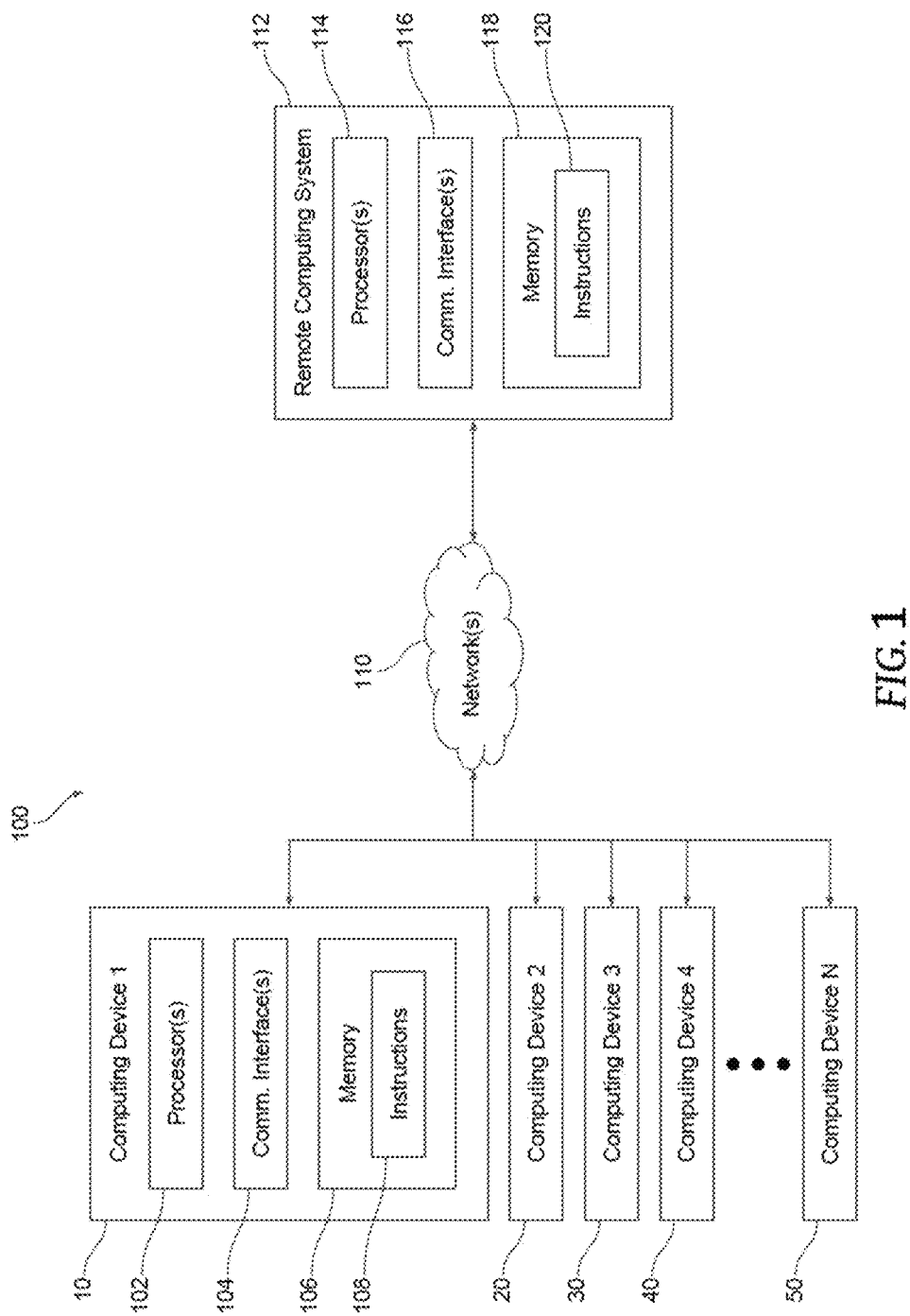
FIG. 1 depicts an example computing environment according to example embodiments of the present disclosure.

Example aspects of the present disclosure are directed to input suggestion. In particular, one or more computing devices can provide (e.g., as part of an operating system (OS), and/or the like) an input interface (e.g., a graphical user interface (GUI) comprising a keyboard, and/or the like) configured to enable a user to input data into one or more applications executed by the computing device(s). Such an interface can be configured to present (e.g., as part of the keyboard, and/or the like) the user with suggested candidate inputs, for example, one or more words, phrases, and/or the like that the user may desire to input (e.g., into an application being utilized, at a current cursor position, and/or the like). For example, the user's historical input, recently input text, and/or the like can be analyzed (e.g., using natural-language models, and/or the like) to generate suggested candidate inputs. The provision of suggested candidate input(s) as described herein can enable a user to more efficiently input data into computing device(s), thereby reducing interaction between the user and the computing device(s). This may be particularly useful for users having reduced dexterity, manual capabilities, and/or the like in all or certain situations, which can make effective interaction with the device(s) problematic, and/or the like.

A user can switch between different and distinct applications executed by the computing device(s), for example, to perform various functions with respect to an undertaken task, and/or the like. For example, a user can utilize a messaging (e.g., chat, short message service (SMS), and/or the like) application to communicate with a contact to schedule an appointment, and/or the like. While utilizing the messaging application, the user may utilize (e.g., switch to, amongst, and/or the like) one or more other applications (e.g., a calendar application, web browser, and/or the like), for example, to identify, locate, determine, and/or the like information pertinent to the conversation with the contact (e.g., their schedule availability, a venue at which to meet, and/or the like).

In accordance with aspects of the disclosure, the computing device(s) can receive data indicating information (e.g., text, graphics, imagery, audio, video, and/or the like) presented by and/or input into one or more of the applications, and based at least in part on such data, the computing device(s) can generate one or more suggested candidate inputs for an application. An interface comprising one or more options to select at least one of the suggested candidate input(s) can be provided in association with the application (e.g., within a GUI of the application, in conjunction with a GUI of the application, adjacent to a GUI of the application, overlaid on a portion of a GUI of the application, as part of a keyboard, via the OS, and/or the like) executed by the computing device(s). A user can utilize the interface to select one of the suggested candidate input(s), and data indicating the same can be received by the computing device(s). Responsive to receiving such data, the computing device(s) can communicate data indicating the selected suggested candidate input to the application.

In some embodiments, the application for which the suggested candidate input(s) are generated can be different and distinct from the application(s) that presented the information, into which the information was input, and/or the like. For example, the data received can indicate information presented by and/or input into a web browser (e.g., pertaining to a venue, such as a restaurant or the like, at which to meet, and/or the like), and the suggested candidate input(s) (e.g., the name of the venue, and/or the like) can be generated for a messaging application (e.g., to communicate to the contact the name of the venue, and/or the like). It will be appreciated that subject to user consent (e.g., regarding potential privacy concerns, and/or the like), this can be performed in an automated fashion, for example, without receiving user input (e.g., via the web browser, and/or the like) indicating a desire to be able to utilize data based at least in part on the information (e.g., presented by and/or input into the web browser, and/or the like) in the different application (e.g., the messaging application, and/or the like). That is, the functionality need not be affirmatively invoked by the user (e.g., via an OS clipboard command such as cut, copy, and/or the like) in order to generate the suggested candidate input(s), provide the interface, and/or the like.

Additionally or alternatively, the computing device(s) can generate the suggested candidate input(s) based at least in part on data indicating information presented by and/or input into the application for which the suggested candidate input(s) are generated. For example, the suggested candidate input(s) (e.g., the name, address, and/or the like of the venue, and/or the like) can be generated for the messaging application (e.g., to communicate to the contact, and/or the like) based at least in part on data indicating information presented by and/or input into the messaging application (e.g., one or more portions of the conversation providing context indicating the name, address, and/or the like of the venue should be input, and/or the like).

In some embodiments, the suggested candidate input(s) can include a suggested candidate input comprising data configured to cause a different and distinct application executed by a different and distinct computing device to output content related to the information presented by and/or input into the application(s) executed by the computing device(s). For example, the suggested candidate input(s) can include a suggested candidate input comprising data configured to cause a different and distinct application (e.g., an application other than the messaging application, such as a web browser, mapping application, product/service-review application, and/or the like) executed by one or more computing devices of the contact to output content related to the information (e.g., pertaining to the venue, and/or the like) presented by and/or input into the application(s) executed by the user's computing device(s).

In some embodiments, the application(s) can communicate the data indicating the information presented by and/or input into them via an application programming interface (API) of the computing device(s) configured to manage a file-based application-indexing log stored on the computing device(s) and comprising data indicating one or more application actions, events, and/or the like. In some of such embodiments, receiving the data indicating the information can include retrieving such data from the file-based application-indexing log via the API, and/or the like. Additionally or alternatively, the data indicating the information can be received via a device-accessibility API of the computing device(s), and/or the like.

In some embodiments, the computing device(s) can utilize a machine learning (ML) model (e.g., based at least in part on data generated by multiple different users' computing devices, via a federated-learning paradigm, and/or the like) to determine, for each of the suggested candidate input(s), a predicted likelihood that a user will select the suggested candidate input via the interface. In some of such embodiments, the computing device(s) can determine, for each of the suggested candidate input(s) for which a selection option is provided in the interface, to include the selection option for the suggested candidate input in the interface based at least in part on the predicted likelihood that the user will select it.

In some embodiments, the computing device(s) can annotate one or more of the suggested candidate input(s) with metadata determined based at least in part on factual knowledge about the user (e.g., their name, their schedule availability, and/or the like), factual knowledge about a physical environment in which the computing device(s) are located (e.g., facts about their current geographic locations, such as the names of streets, businesses, and/or the like, facts about society, such as the names, titles, characteristics, and/or the like of famous people, entities, organizations, places, events, and/or the like), a portion of the information provided by and/or input into the application(s), and/or the like. In some of such embodiments, for each of the annotated suggested candidate input(s), the computing device(s) can determine the predicted likelihood that the user will select the suggested candidate input based at least in part on its metadata.

Additionally or alternatively, for each of one or more of the suggested candidate input(s), the computing device(s) can generate one or more numeric descriptions of one or more features of the suggested candidate input distinct from its content. For example, such features can include a type of societal entity (e.g., person, organization, business, and/or the like) associated with the suggested candidate input, how recently and/or how frequently the content of the suggested candidate input was presented by the computing device(s), and/or the like. In some embodiments, for each of such suggested candidate input(s), the computing device(s) can determine the predicted likelihood that the user will select the suggested candidate input based at least in part on one or more of its corresponding numeric description(s).

In some embodiments, for each of such suggested candidate input(s), the computing device(s) can generate a training record for the ML model based at least in part on the numeric description(s) for the suggested candidate input, whether the user selected the suggested candidate input, and/or the like. For example, such training record(s) can enable the ML model to more accurately process inputs based at least in part on their generic characteristics, contexts, structures, and/or the like. Additionally or alternatively, such training record(s) can omit, obscure, and/or the like the content of the suggested candidate input(s), the information presented by and/or input into the application(s), and/or the like, which can, for example, mitigate privacy concerns (e.g., in the context of a federated-learning paradigm, and/or the like). In some embodiments, a training record can be generated based at least in part on a determination that the user manually input data corresponding to content of the suggested candidate input, for example, in lieu of selecting the suggested candidate input via the interface. For example, such a record can indicate the suggested candidate input was accurate, correct, and/or the like even if the user failed to select the suggested candidate input.

In some embodiments, for each of one or more of the suggested candidate input(s), the computing device(s) can determine the predicted likelihood that the user will select the suggested candidate input based at least in part on data identifying the application for which the suggested candidate input was generated, a selected input field of such application, and/or the like. For example, the user can switch to a ride-sharing application; a destination field therein can be selected (e.g., by the user, by default, and/or the like); based at least in part on data identifying the ride-sharing application, the destination field, and/or the like, the computing device(s) can determine one or more of the suggested candidate input(s) (e.g., an address of the venue, and/or the like) has a higher likelihood of being selected than one or more other of the suggested candidate input(s); and/or the like.

In some embodiments, a prominence within the interface of one or more of the option(s) for selecting the suggested candidate input(s) can be determined based at least in part on the likelihood that the user will select the suggested candidate input(s). For example, in some embodiments, providing the interface can include generating a graphical user interface (GUI) comprising one or more elements corresponding to the option(s) for selecting the suggested candidate input(s). In some of such embodiments, the computing device(s) can determine one or more sizes of such element(s) based at least in part on the likelihood that the user will select their corresponding suggested candidate input(s) (e.g., a larger element could be generated for a suggested candidate input with a higher likelihood of being selected, and/or the like). Additionally or alternatively, the computing device(s) can determine a number of elements (e.g., corresponding to one or more other (or alternative) suggested candidate inputs, and/or the like) to be presented alongside an element based at least in part on the likelihood that the user will select the suggested candidate input corresponding to the element (e.g., fewer elements could be presented alongside an element for a suggested candidate input with a higher likelihood of being selected, and/or the like).

The technology described herein can provide a number of technical effects and benefits. For example, the technology described herein can enable a user to interact with one or more computing devices more efficiently, for example, by enabling them to more efficiently input data into various applications, and/or the like. By reducing interaction between the user and the computing device(s), device resources (e.g., energy, and/or the like) can be conserved. As previously indicated, the technology described herein may be particularly useful for users having reduced dexterity, manual capabilities, and/or the like, which can make effective interaction with the device(s) problematic, and/or the like. For example, the technology described herein can reduce the need for users to switch between applications in order to identify, locate, manually copy, and/or the like information for use in another application, and/or the like. Additionally or alternatively, the technology described herein can facilitate the development of an ML model capable of accurately suggesting candidate inputs based at least in part on their generic characteristics, use context, and/or the like. Moreover, the technology described herein can permit such a model to be developed in a manner that leverages the resources, wisdom, and/or the like of the crowd (e.g., via a federated-learning paradigm, and/or the like) but mitigates potential privacy concerns of participating users, and/or the like.

With reference now to the Figures, example embodiments of the present disclosure will be discussed in further detail.

FIG. 1 depicts an example computing environment according to example embodiments of the present disclosure.

Referring to FIG. 1, environment 100 can include one or more computing devices (e.g., one or more desktop computers, laptop computers, tablet computers, mobile devices, smartphones, servers, and/or the like). For example, environment 100 can include computing devices 10, 20, 30, 40, and 50 and computing system 112, which can include one or more computing devices. Environment 100 can also include one or more networks 110 (e.g., one or more wired networks, wireless networks, and/or the like). Network(s) 110 can interface computing devices 10, 20, 30, 40, and/or 50 with one another and/or with computing system 112.

Computing device 10 can include one or more processor(s) 102, one or more communication interfaces 104, and memory 106 (e.g., one or more hardware components for storing executable instructions, data, and/or the like). Communication interface(s) 104 can enable computing device 10 to communicate with computing devices 20, 30, 40, and/or 50 and/or with computing system 112. Memory 106 can include (e.g., store, and/or the like) instructions 108. When executed by processor(s) 102, instructions 108 can cause computing device 10 to perform one or more operations, functions, and/or the like described herein. It will be appreciated that computing devices 20, 30, 40, and/or 50 can include one or more of the components described above with respect to computing device 10.

Computing system 112 can include one or more processor(s) 114, one or more communication interfaces 116, and memory 118 (e.g., one or more hardware components for storing executable instructions, data, and/or the like). Communication interface(s) 116 can enable computing system 112 to communicate with computing devices 10, 20, 30, 40, and/or 50. Memory 118 can include (e.g., store, and/or the like) instructions 120. When executed by processor(s) 114, instructions 120 can cause computing system 112 to perform one or more operations, functions, and/or the like described herein.

Unless explicitly indicated otherwise, the operations, functions, and/or the like described herein can be performed by computing devices 10, 20, 30, 40, and/or 50 and/or computing system 112 (e.g., by computing device 10, 20, 30, 40, or 50, by computing system 112, by a combination of computing devices 10, 20, 30, 40, and/or 50 and/or computing system 112, and/or the like).

Figure 2A:
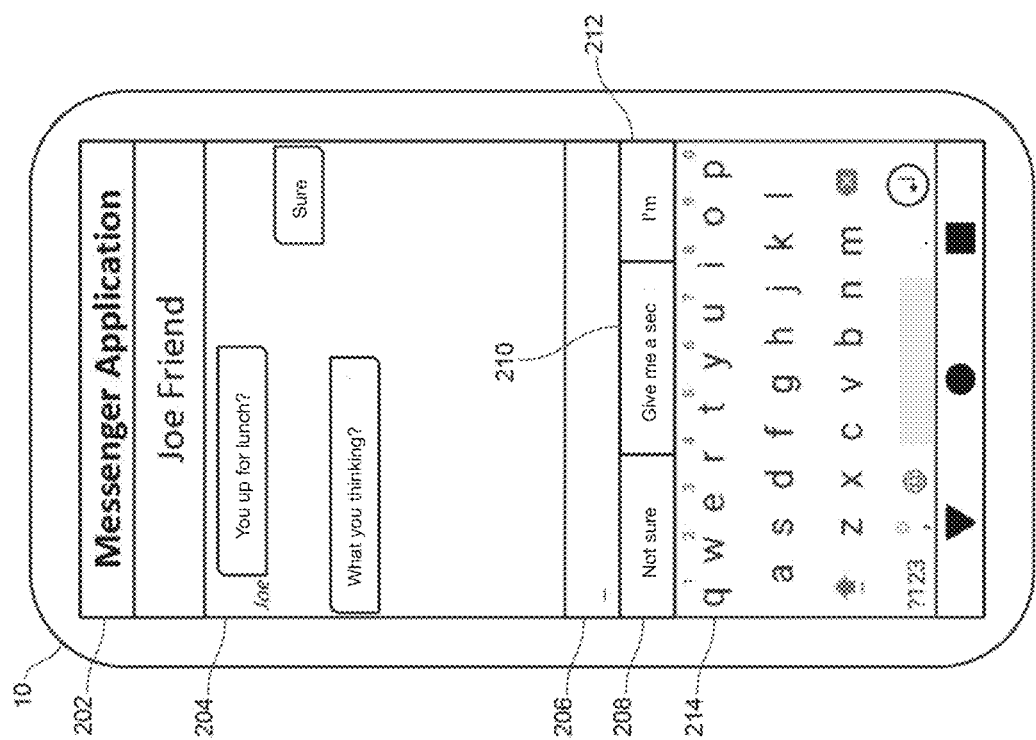
FIGS. 2A-N depict example graphical user interfaces (GUIs) according to example embodiments of the present disclosure.

FIGS. 2A-N depict example graphical user interfaces (GUIs) according to example embodiments of the present disclosure.

Referring to FIG. 2A, computing device 10 can include a display (e.g., a touchscreen, and/or the like) and can generate data describing one or more GUIs. The data describing the GUI(s) can be communicated to the display, which can present (e.g., render, display, and/or the like) the GUI(s) (e.g., for viewing by a user, and/or the like). For example, computing device 10 can generate data describing GUI 202, which can be associated with an application executed by computing device 10 (e.g., a messenger application, and/or the like) and can be presented by the display of computing device 10.

Computing device 10 can provide, in association with the application (e.g., within a GUI of the application, in conjunction with a GUI of the application, adjacent to a GUI of the application, overlaid on a portion of a GUI of the application, as part of a keyboard, via the OS, and/or the like) an input interface (e.g., one or more GUI elements comprising a keyboard, and/or the like) configured to enable a user to input data into the application. For example, GUI 202 can include element 214 (e.g., a QWERTY keyboard, and/or the like), which can be configured to enable a user of computing device 10 to input data into the application associated with GUI 202 (e.g., by interacting with one or more portions of GUI 202 via the display of computing device 10, and/or the like). While for purposes of illustration, convenience, clarity, and/or the like, reference is made herein to interfaces comprising one or more GUIs, it will be appreciated that other types of interfaces (e.g., audio-prompt/command interfaces, human-gesture interfaces, and/or the like) can be utilized (e.g., in addition to GUI(s), in lieu of GUI(s), and/or the like) in accordance with embodiments of the present disclosure.

In accordance with aspects of the disclosure, computing device 10 can receive data indicating information (e.g., text, graphics, imagery, audio, video, and/or the like) presented by and/or input into one or more different and distinct applications executed by computing device 10. For example, computing device 10 can receive data indicating information presented via element 204 of GUI 202 by the application associated with GUI 202 (e.g., text comprising messages exchanged between the user of computing device 10 and an individual named "Joe Friend," and/or the like). Additionally or alternatively, computing device 10 can receive data indicating information input via element 206 of GUI 202 into the application associated with GUI 202 (e.g., text comprising messages composed (or being composed) by the user of computing device 10, and/or the like).

In some embodiments, the application(s) can communicate the data indicating the information presented by and/or input into them via an application programming interface (API) of computing device 10 configured to manage a file-based application-indexing log stored on computing device 10 and comprising data indicating one or more application actions, events, and/or the like. In some of such embodiments, computing device 10 can receive the data indicating the information by retrieving such data from the file-based application-indexing log via the API, and/or the like. Additionally or alternatively, computing device 10 can receive the data indicating the information via a device-accessibility API of computing device 10, and/or the like. It will be appreciated that receiving such data may be subject to consent of the user of computing device 10 (e.g., to mitigate privacy concerns, and/or the like).

Based at least in part on such data, computing device 10 can generate one or more suggested candidate inputs (e.g., one or more words, phrases, and/or the like) for an application executed by computing device 10. For example, based at least in part on the data indicating the information presented via element 204 and/or input via element 206, computing device 10 can generate one or more suggested candidate inputs (e.g., "Not sure," "Give me a sec," "I'm," and/or the like) that the user of computing device 10 may desire to input into the application associated with GUI 202 via a field corresponding to element 206 of GUI 202, and/or the like. In some embodiments, computing device 10 can analyze (e.g., using natural-language models, and/or the like) the data indicating the information to generate the suggested candidate input(s).

The input interface provided by computing device 10 can include one or more options to select at least one of the suggested candidate input(s). For example, GUI 202 can include elements 208, 210, and 212, which can correspond to options for selecting one or more of the generated suggested candidate input(s) (e.g., "Not sure," "Give me a sec," "I'm," and/or the like). The user of computing device 10 can utilize the interface to select one of the suggested candidate input(s), and computing device 10 can receive data indicating the same. For example, the user of computing device 10 can utilize the interface (e.g., invoke element 210, and/or the like) to select the suggested candidate input (e.g., "Give me a sec," and/or the like) corresponding to element 210, and computing device 10 can receive data indicating the selected suggested candidate input. Responsive to receiving such data, computing device 10 can communicate data indicating the selected suggested candidate input to the application. For example, responsive to receiving the data indicating the user of computing device 10 has selected the suggested candidate input (e.g., "Give me a sec," and/or the like) corresponding to element 210, computing device 10 can communicate data indicating the selected suggested candidate input to the application associated with GUI 202 (e.g., by populating the field corresponding to element 206 with "Give me a sec," and/or the like).

The user of computing device 10 can switch between the different and distinct application(s) executed by computing device 10, for example, to perform various functions with respect to an undertaken task, and/or the like. For example, the user can utilize the application associated with GUI 202 (e.g., the messaging application, and/or the like) to communicate with another individual (e.g., Joe Friend, and/or the like) to schedule a lunch, and/or the like. While utilizing the application associated with GUI 202, the user may utilize (e.g., switch to, amongst, and/or the like) one or more of the other application(s) executed by computing device 10 (e.g., a calendar application, web browser, and/or the like), for example, to identify, locate, determine, and/or the like information pertinent to the conversation with the other individual (e.g., their schedule availability, a restaurant at which to meet, and/or the like).

Figure 2B:
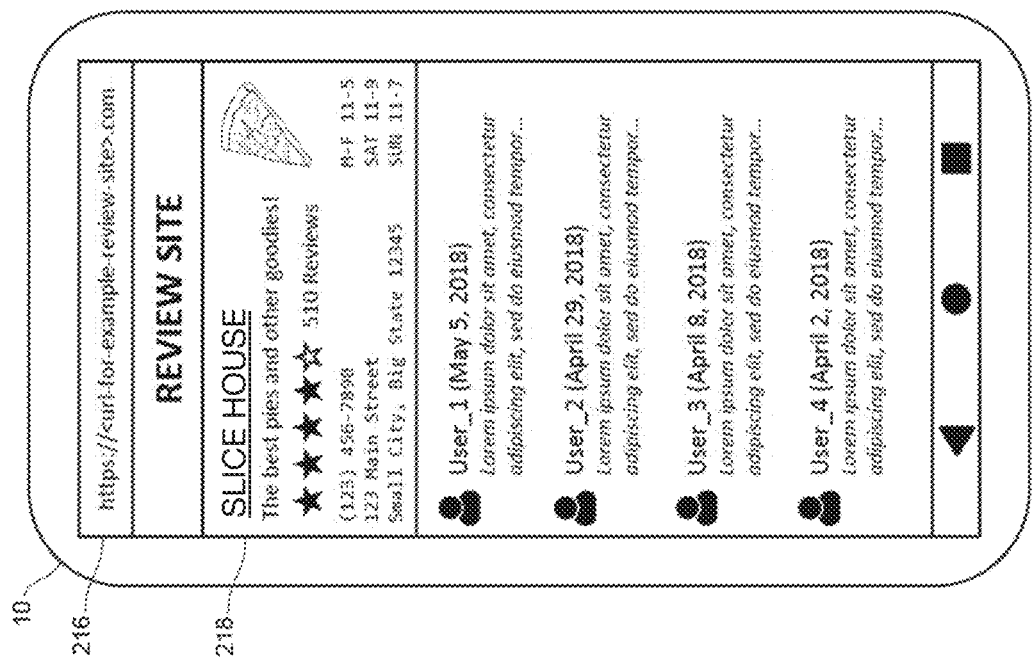

For example, referring to FIG. 2B, the user of computing device 10 can switch to an application (e.g., a web browser, and/or the like) associated with GUI 216 (e.g., to identify a restaurant at which to meet Joe Friend, and/or the like). Computing device 10 can generate data describing GUI 216, which can be presented by the display of computing device 10, and/or the like. As previously indicated, computing device 10 can receive data indicating information presented by and/or input into the application(s) executed by computing device 10. For example, computing device 10 can receive data indicating information presented via element 218 of GUI 216 by the application associated with GUI 216 (e.g., text from a website pertaining to the restaurant, and/or the like).

Figure 2C:
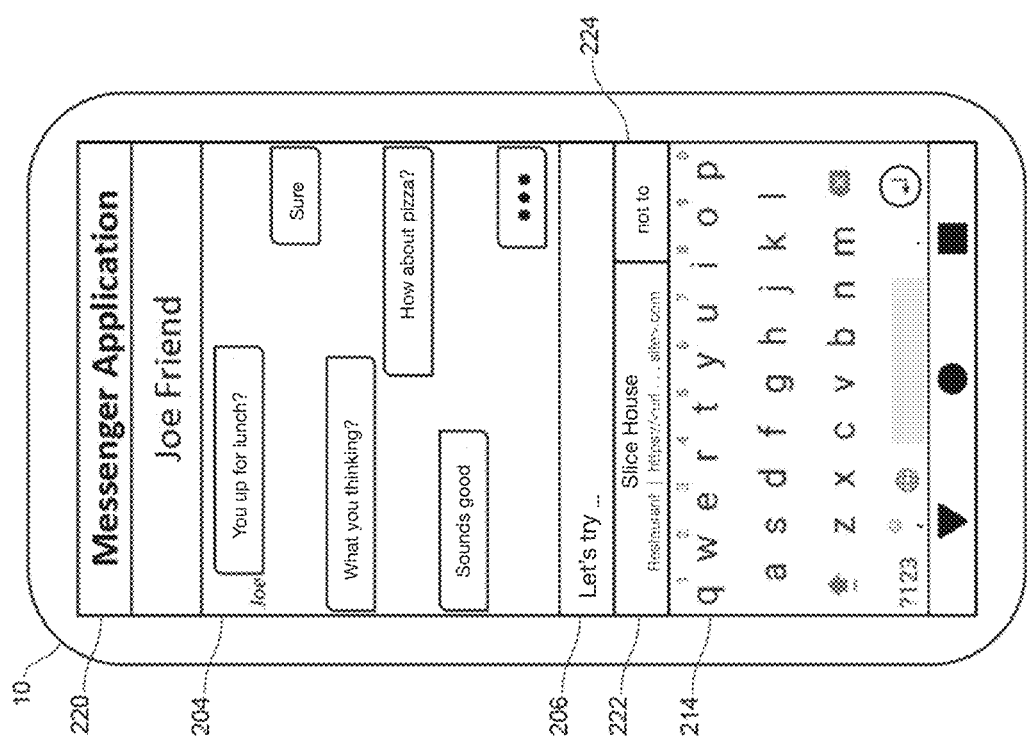

The user of computing device 10 can then switch back to the previously utilized application associated with GUI 202 (e.g., the messaging application, and/or the like). For example, referring to FIG. 2C, the user of computing device 10 can switch to an application (e.g., the messaging application, and/or the like) associated with GUI 220 (e.g., to resume communicating with Joe Friend, and/or the like). Computing device 10 can generate data describing GUI 220, which can be presented by the display of computing device 10, and/or the like. Computing device 10 can receive data indicating information presented via element 204 of GUI 220 by the application associated with GUI 220 (e.g., "You up for lunch?", "Sure," "What you thinking?", "How about pizza?", "Sounds good," and/or the like). Additionally or alternatively, computing device 10 can receive data indicating information input via element 206 of GUI 220 into the application associated with GUI 220 (e.g., "Let's try," and/or the like).

In accordance with aspects of the disclosure, computing device 10 can generate, based at least in part on the received data, one or more suggested candidate inputs for an application executed by computing device 10. For example, based at least in part on the data indicating the information presented via element 218 (e.g., the text from the website pertaining to the restaurant, and/or the like), the data indicating the information presented via element 204, and/or the data indicating the information input via element 206, computing device 10 can generate one or more suggested candidate inputs (e.g., "Slice House," "not to," and/or the like) that the user of computing device 10 may desire to input into the application associated with GUI 220 via a field corresponding to element 206 of GUI 220, and/or the like. In some embodiments, one or more of the suggested candidate input(s) (e.g., "Slice House," and/or the like) can include metadata (e.g., "Restaurant," "https://<url . . . site>.com," and/or the like) determined based at least in part on one or more entities (e.g., the restaurant, the website pertaining to the restaurant, and/or the like) associated with such suggested candidate input(s).

As previously indicated, the input interface provided by computing device 10 can include one or more options to select at least one of the suggested candidate input(s). For example, GUI 220 can include elements 222 and 224, which can correspond to options for selecting one or more of the generated suggested candidate input(s) (e.g., "Slice House," "not to," and/or the like). The user of computing device 10 can utilize the interface to select one of the suggested candidate input(s), and computing device 10 can receive data indicating the same. For example, the user of computing device 10 can utilize the interface (e.g., invoke element 222, and/or the like) to select the suggested candidate input (e.g., "Slice House," and/or the like) corresponding to element 222, and computing device 10 can receive data indicating the selected suggested candidate input. Responsive to receiving such data, computing device 10 can communicate data indicating the selected suggested candidate input to the application. For example, responsive to receiving the data indicating the user of computing device 10 has selected the suggested candidate input (e.g., "Slice House," and/or the like) corresponding to element 222, computing device 10 can communicate data indicating the selected suggested candidate input to the application associated with GUI 220 (e.g., by populating the field corresponding to element 206 with "Slice House," and/or the like).

In some embodiments (e.g., to mitigate potential privacy concerns, and/or the like), a user can be provided with one or more controls for allowing the user to make one or more elections as to if and/or when the methods, systems, functions, operations, and/or the like described herein can enable collection of certain information (e.g., presented by and/or input into the application(s), and/or the like). Additionally or alternatively, certain data (e.g., presented by and/or input into the application(s), and/or the like) can be treated in one or more ways before being stored, used, and/or the like (e.g., so personally identifiable information can be removed, and/or the like). For example, a user's identity, data associated therewith, and/or the like can be treated so that no personally identifiable information can be determined for the user, and/or the like. Thus, the user can have control over what information is collected about the user, how that information is used, what information is provided to the user, and/or the like.

It will be appreciated that subject to user consent (e.g., regarding potential privacy concerns, and/or the like), this can be performed in an automated fashion, for example, without receiving user input via the application associated with GUI 216 (e.g., the web browser, and/or the like) indicating a desire to be able to utilize data based at least in part on the information (e.g., presented by and/or input into the web browser, and/or the like) in the application associated with GUI 220 (e.g., the messaging application, and/or the like). That is, the functionality need not be affirmatively invoked by the user (e.g., via an OS clipboard command such as cut, copy, and/or the like) in order to generate the suggested candidate input(s), provide the interface including the option(s) to select at least one of the suggested candidate input(s), and/or the like.

In some embodiments, computing device 10 can utilize a machine learning (ML) model to determine, for each of the suggested candidate input(s), a predicted likelihood that the user will select the suggested candidate input via the interface (e.g., in order to rank the suggested candidate input(s) by their likelihood of being selected, identify one or more of the suggested candidate input(s) likely to be selected, and/or the like). In some of such embodiments, computing device 10 can determine, for each of the suggested candidate input(s) for which a selection option is provided in the interface, to include the selection option for the suggested candidate input in the interface based at least in part on the predicted likelihood that the user will select it. For example, computing device 10 can utilize an ML model to determine a likelihood that the user will select the suggested candidate input corresponding to element 222 (e.g., "Slice House," and/or the like), a likelihood that the user will select the suggested candidate input corresponding to element 224 (e.g., "not to," and/or the like), as well as one or more likelihoods that the user will select one or more other suggested candidate inputs generated by computing device 10, and computing device 10 can determine to include, in the input interface, the options for selecting the suggested candidate input(s) corresponding to elements 222 and 224 based at least in part on the determined likelihoods that the user will select them (e.g., in lieu of the other suggested candidate input(s) generated by computing device 10, and/or the like).

In some embodiments, for each of one or more of the suggested candidate input(s), computing device 10 can determine the predicted likelihood that the user will select the suggested candidate input based at least in part on data identifying the application for which the suggested candidate input was generated, a selected input field of such application, and/or the like. For example, computing device 10 can determine the predicted likelihood that the user will select the suggested candidate input corresponding to element 222 (e.g., "Slice House," and/or the like) based at least in part on data identifying the application associated with GUI 220, the field corresponding to element 206 of GUI 220, and/or the like.

In some embodiments, computing device 10 can annotate one or more of the suggested candidate input(s) with metadata determined based at least in part on factual knowledge about the user (e.g., their name, their schedule availability, and/or the like), factual knowledge about a physical environment in which computing device 10 is located (e.g., facts about its current geographic location, such as the names of streets, businesses, and/or the like, facts about society, such as the names, titles, characteristics, and/or the like of famous people, entities, organizations, places, events, and/or the like), a portion of the information provided by and/or input into the application(s) executed by computing device 10, and/or the like. In some of such embodiments, for each of the annotated suggested candidate input(s), computing device 10 can determine the predicted likelihood that the user will select the suggested candidate input based at least in part on its metadata.

Additionally or alternatively, for each of one or more of the suggested candidate input(s), computing device 10 can generate one or more numeric descriptions of one or more features of the suggested candidate input distinct from its content. For example, such features can include a type of societal entity (e.g., person, organization, business, and/or the like) associated with the suggested candidate input, how recently and/or how frequently the content of the suggested candidate input was presented by computing device 10, and/or the like. In some embodiments, for each of such suggested candidate input(s), computing device 10 can determine the predicted likelihood that the user will select the suggested candidate input based at least in part on one or more of its corresponding numeric description(s).

In some embodiments, for each of such suggested candidate input(s), computing device 10 can generate a training record for the ML model based at least in part on the numeric description(s) for the suggested candidate input, whether the user selected the suggested candidate input, and/or the like. For example, such training record(s) can enable the ML model to more accurately process inputs based at least in part on their generic characteristics, contexts, structures, and/or the like. Additionally or alternatively, such training record(s) can omit, obscure, and/or the like the content of the suggested candidate input(s), the information presented by and/or input into the application(s), and/or the like, which can, for example, mitigate privacy concerns (e.g., in the context of a federated-learning paradigm, and/or the like). In some embodiments, a training record can be generated based at least in part on a determination that the user manually input data corresponding to content of the suggested candidate input (e.g., typed out "Slice House" via element 214, and/or the like), for example, in lieu of selecting the suggested candidate input via the interface (e.g., by invoking element 222, and/or the like). For example, such a record can indicate the suggested candidate input was accurate, correct, and/or the like even if the user failed to select the suggested candidate input.

In some embodiments, the ML model can be based at least in part on data generated by multiple different users' computing devices, for example, via a federated-learning paradigm, and/or the like. For example, computing devices 10, 20, 30, 40, and/or 50 can be associated with a federated-learning paradigm coordinated by computing system 112, and/or the like (e.g., to discover patterns by which users select, ignore, and/or the like suggested candidate inputs having particular characteristics, provided in certain contexts, and/or the like). Computing devices 10, 20, 30, 40, and/or 50 can receive an ML model from computing system 112; generate suggested candidate inputs; utilize the ML model to determine likelihoods that the suggested candidate inputs will be selected; generate training records based at least in part on the generated suggested candidate inputs, their determined respective likelihoods of being selected, data indicating whether they were selected, ignored, and/or the like; generate updates to the ML model (e.g., differentials, and/or the like) based at least in part on the training records; and communicate the updates to computing system 112, which can refine the ML model based at least in part on the updates and communicate the refined ML model (e.g., reflecting the wisdom of the group's experiences, and/or the like) to computing devices 10, 20, 30, 40, and/or 50 for subsequent utilization, and/or the like.

In some embodiments, the ML model can be, otherwise include, and/or the like various ML models, such as neural networks (e.g., deep neural networks, and/or the like), other types of ML models, including non-linear models, linear models, multilayer models, and/or the like. Neural networks can include feed-forward neural networks, recurrent neural networks (e.g., long short-term memory recurrent neural networks, and/or the like), convolutional neural networks, other forms of neural networks, and/or the like. In some embodiments, the ML model can be trained using supervised techniques, semi-supervised techniques, unsupervised techniques, and/or the like.

In some embodiments, the ML model can comprise a dynamic vocabulary recurrent neural network, which can be configured to score the generated suggested candidate input(s) based at least in part on their likelihood of being selected by the user. In some of such embodiments, the ML model can be conceptually structured such that a first side (e.g., the left-hand side, and/or the like) takes in input tokens, data identifying the application for which the suggested candidate input(s) were generated, a selected input field of such application, and/or the like, and a second side (e.g., the right-hand side, and/or the like) takes in the suggested candidate input(s), their annotated metadata, numeric description(s), and/or the like. The first side can generate a next-word embedding (e.g., via a recurrent neural network, and/or the like), the second side can embed the suggested candidate input(s) in the same vectorial space, and the network can output data (e.g., numerical values, and/or the like) for the suggested candidate input(s) indicating their respective similarities to the next-word embedding, and/or the like.

In some embodiments, the suggested candidate input(s) can include a suggested candidate input comprising data configured to cause an application different and distinct from the application for which the suggested candidate input(s) were generated to output content related to the information presented by and/or input into the application(s) executed by computing device 10. In some of such embodiments, the different and distinct application can be executed by a computing device different and distinct from computing device 10.

Figure 2D:
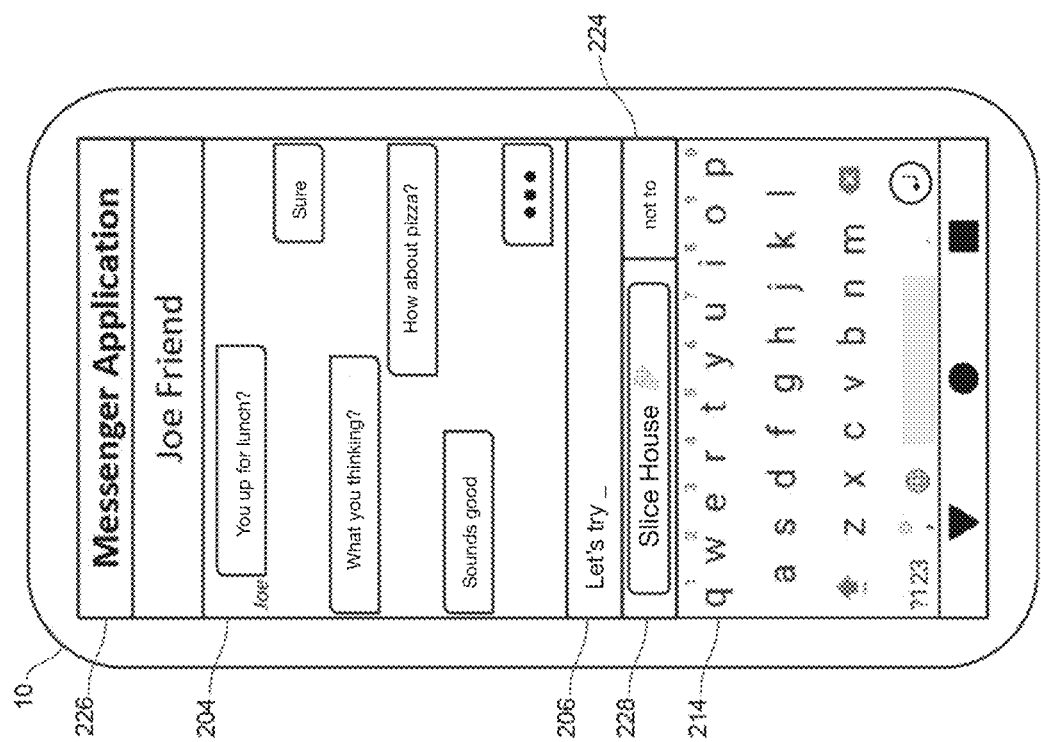

For example, referring to FIG. 2D, as previously indicated, the user of computing device 10 can switch to an application (e.g., the messaging application, and/or the like) associated with GUI 226 (e.g., to resume communicating with Joe Friend, and/or the like); computing device 10 can generate data describing GUI 226, which can be presented by the display of computing device 10, and/or the like; computing device 10 can receive data indicating information presented via element 204 of GUI 226 by the application associated with GUI 226 (e.g., "You up for lunch?", "Sure," "What you thinking?", "How about pizza?", "Sounds good," and/or the like) and/or data indicating information input via element 206 of GUI 226 into the application associated with GUI 220 (e.g., "Let's try," and/or the like); and based at least in part on the data indicating the information presented via element 218 (e.g., the text from the website pertaining to the restaurant, and/or the like), the data indicating the information presented via element 204, and/or the data indicating the information input via element 206, computing device 10 can generate one or more suggested candidate inputs that the user of computing device 10 may desire to input into the application associated with GUI 226 via a field corresponding to element 206 of GUI 226, and/or the like. As previously indicated, in some embodiments, one or more of the suggested candidate input(s) (e.g., "Slice House," and/or the like) can include metadata determined based at least in part on one or more entities (e.g., the restaurant, the website pertaining to the restaurant, and/or the like) associated with such suggested candidate input(s). In some of such embodiments, the metadata can comprise one or more GUI interface elements, for example, graphics, icons, and/or the like (e.g., an image of a pizza slice, such as one from the website pertaining to the restaurant, and/or the like).

Computing device 10 can be different and distinct from computing device 20, which can, for example, be utilized by a different user (e.g., Joe Friend, and/or the like). The generated suggested candidate input(s) can include a suggested candidate input (e.g., data object, hyperlink, and/or the like) configured to cause an application (e.g., a web browser, and/or the like) executed by computing device 20 to output content related to the information presented by and/or input into the application associated with GUI 226, for example, to output the information presented via element 218 (e.g., the website pertaining to the restaurant, and/or the like). The input interface provided by computing device 10 can include an option to select the suggested candidate input configured to cause the application executed by computing device 20 to output such content. For example, GUI 226 can include element 228, which can correspond to such an option. The user of computing device 10 can utilize the interface (e.g., invoke element 228, and/or the like) to select the suggested candidate input configured to cause the application executed by computing device 20 to output the related content, and computing device 10 can receive data indicating the same. Responsive to receiving such data, computing device 10 can communicate, to the application associated with GUI 226 (e.g., by populating the field corresponding to element 206 with the data object, hyperlink, and/or the like), data indicating the suggested candidate input configured to cause the application executed by computing device 20 to output the related content.

Figure 2E:
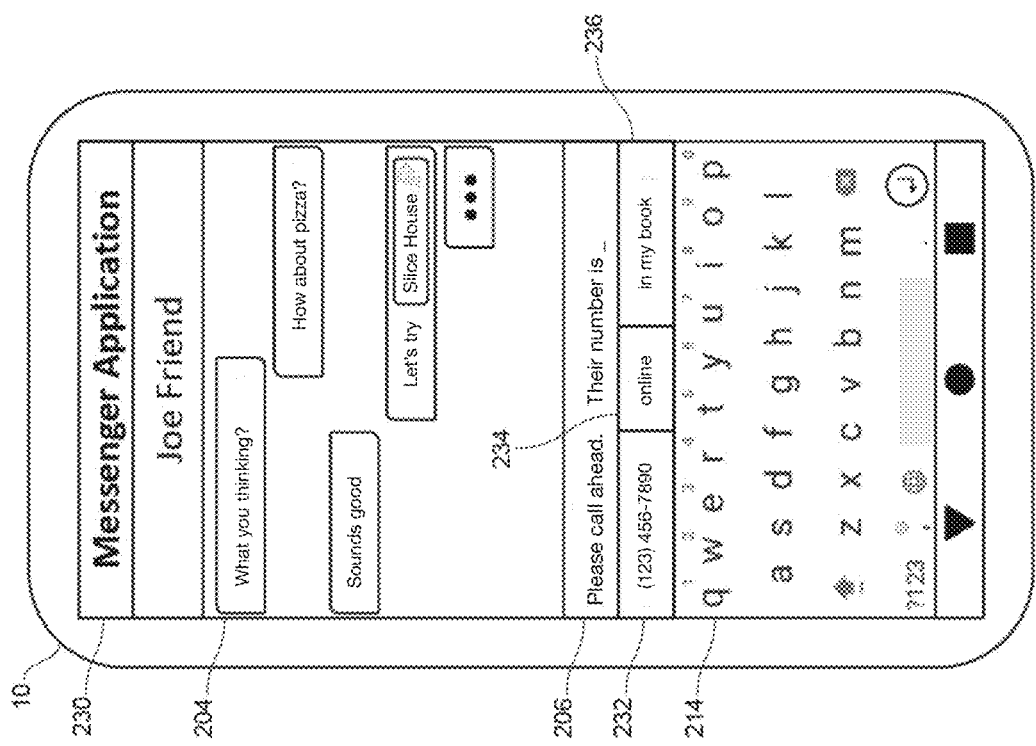

In some embodiments, the suggested candidate input(s) can include a suggested candidate input comprising data configured in accordance with a predetermined format, and/or the like. For example, referring to FIG. 2E, the user of computing device 10 can utilize an application (e.g., the messaging application, and/or the like) associated with GUI 230 (e.g., to communicate with Joe Friend, and/or the like); computing device 10 can generate data describing GUI 230, which can be presented by the display of computing device 10, and/or the like; computing device 10 can receive data indicating information presented via element 204 of GUI 230 by the application associated with GUI 230 (e.g., "What you thinking?", "How about pizza?", "Sounds good," "Let's try Slice House," and/or the like) and/or data indicating information input via element 206 of GUI 230 into the application associated with GUI 230 (e.g., "Please call ahead. Their number is," and/or the like); and based at least in part on the data indicating the information presented via element 218 (e.g., the text from the website pertaining to the restaurant, and/or the like), the data indicating the information presented via element 204, and/or the data indicating the information input via element 206, computing device 10 can generate one or more suggested candidate inputs (e.g., "(123) 456-7890," "online," "in my book," and/or the like) that the user of computing device 10 may desire to input into the application associated with GUI 230 via a field corresponding to element 206 of GUI 230, and/or the like.

The generated suggested candidate input(s) can include a suggested candidate input (e.g., "(123) 456-7890," and/or the like) comprising data configured in accordance with a predetermined format (e.g., a phone number, and/or the like). The input interface provided by computing device 10 can include one or more options for selecting at least one of the suggested candidate input(s). For example, GUI 230 can include elements 232, 234, and 236, which can correspond to options for selecting one or more of the generated suggested candidate input(s) (e.g., "(123) 456-7890," "online," "in my book," and/or the like). The option(s) can include an option for selecting the suggested candidate input comprising the data configured in accordance with the predetermined format. For example, GUI 230 can include element 232, which can correspond to an option for selecting the suggested candidate input comprising the data configured in accordance with the predetermined format (e.g., "(123) 456-7890," and/or the like).

As previously indicated, in some embodiments, computing device 10 can determine (e.g., utilizing the ML model, and/or the like), for each of the suggested candidate input(s), a predicted likelihood that the user will select the suggested candidate input via the interface. In some of such embodiments, for one or more of the suggested candidate input(s) (e.g., the suggested candidate input(s) for which selection option(s) will be included in the interface, and/or the like), computing device 10 can determine one or more prominences within the interface of one or more of the option(s) for selecting the suggested candidate input(s) based at least in part on the likelihood that the user will select the suggested candidate input(s).

For example, computing device 10 can determine one or more sizes of element(s) 224, 228, 232, 234, and/or 236 based at least in part on the likelihood that the user will select their corresponding suggested candidate input(s). In some embodiments, computing device 10 can determine an element (e.g., element 228, and/or the like) corresponding to a suggested candidate input with a higher likelihood of being selected should have a larger size than an element (e.g., element 224, and/or the like) corresponding to a suggested candidate input with a lower likelihood of being selected, and/or the like. Additionally or alternatively, computing device 10 can determine a number of elements (e.g., corresponding to one or more other (or alternative) suggested candidate inputs, and/or the like) to be presented alongside an element based at least in part on the likelihood that the user will select the suggested candidate input corresponding to the element. For example, in some embodiments, computing device 10 can determine to present fewer elements (e.g., element 224, and/or the like) alongside an element (e.g., element 228, and/or the like) corresponding to a suggested candidate input with a higher likelihood of being selected in comparison with a number of elements (e.g., elements 234, 236, and/or the like) determined by computing device 10 to be presented alongside an element (e.g., element 232, and/or the like) corresponding to a suggested candidate input with a lower likelihood of being selected, and/or the like.

The user of computing device 10 can utilize the interface (e.g., invoke element 232, and/or the like) to select the suggested candidate input comprising the data configured in accordance with the predetermined format, and computing device 10 can receive data indicating the same. Responsive to receiving such data, computing device 10 can communicate, to the application associated with GUI 230 (e.g., by populating the field corresponding to element 206 with "(123) 456-7890," and/or the like), data indicating the suggested candidate input comprising the data configured in accordance with the predetermined format.

As previously indicated, in some embodiments, the suggested candidate input(s) can include a suggested candidate input comprising data configured to cause an application different and distinct from the application for which the suggested candidate input(s) were generated to output content related to the information presented by and/or input into the application(s) executed by computing device 10. In some of such embodiments, the different and distinct application can be executed by computing device 10.

Figure 2F:
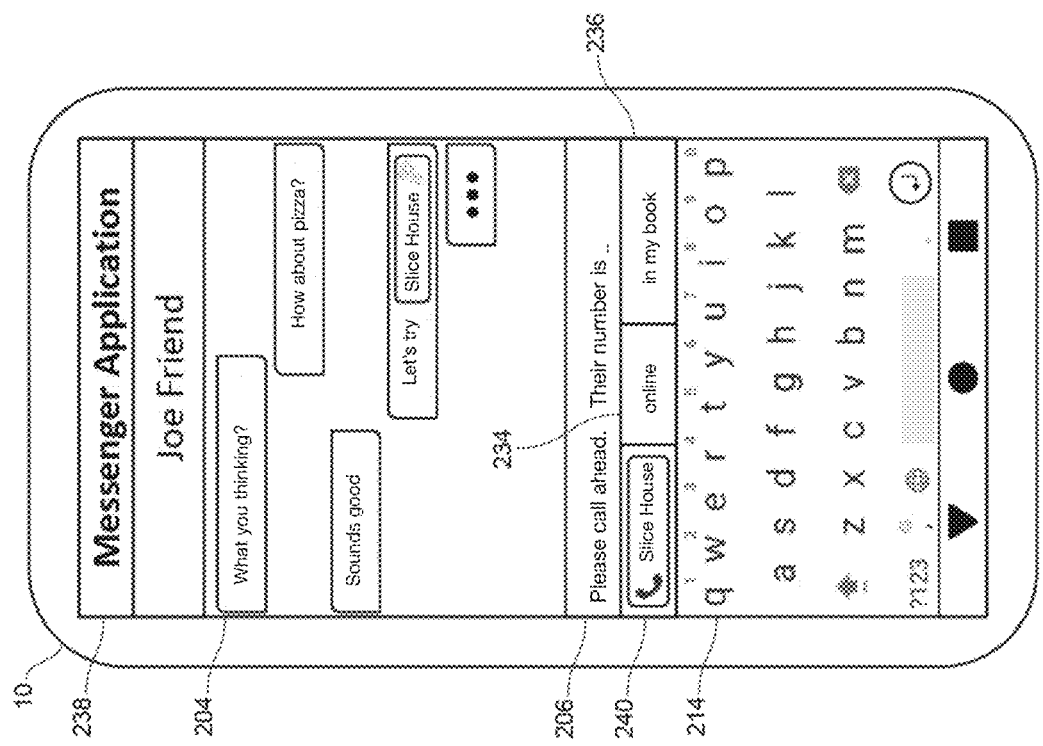

For example, referring to FIG. 2F, the user of computing device 10 can utilize an application (e.g., the messaging application, and/or the like) associated with GUI 238 (e.g., to communicate with Joe Friend, and/or the like); computing device 10 can generate data describing GUI 238, which can be presented by the display of computing device 10, and/or the like; computing device 10 can receive data indicating the information presented via element 204 of GUI 238 by the application associated with GUI 238 (e.g., "What you thinking?", "How about pizza?", "Sounds good," "Let's try Slice House," and/or the like) and/or data indicating information input via element 206 of GUI 238 into the application associated with GUI 238 (e.g., "Please call ahead. Their number is," and/or the like); and based at least in part on the data indicating the information presented via element 218 (e.g., the text from the website pertaining to the restaurant, and/or the like), the data indicating the information presented via element 204, and/or the data indicating the information input via element 206, computing device 10 can generate one or more suggested candidate inputs that the user of computing device 10 may desire to input into the application associated with GUI 238 via a field corresponding to element 206 of GUI 238, and/or the like.

The generated suggested candidate input(s) can include a suggested candidate input (e.g., data object, hyperlink, and/or the like) configured to cause a different and distinct application (e.g., a contact-management application, and/or the like) executed by computing device 10 to output content related to the information presented by and/or input into the application associated with GUI 238, for example, to output the information presented via element 218 (e.g., a portion of the text from the website pertaining to the restaurant, and/or the like). The input interface provided by computing device 10 can include an option to select the suggested candidate input configured to cause the different and distinct application to output such content. For example, GUI 238 can include element 240, which can correspond to such an option. The user of computing device 10 can utilize the interface (e.g., invoke element 240, and/or the like) to select the suggested candidate input configured to cause the different and distinct application to output the related content, and computing device 10 can receive data indicating the same. Responsive to receiving such data, computing device 10 can communicate (e.g., by populating the field corresponding to element 206 with the data object, hyperlink, and/or the like), data indicating the suggested candidate input configured to cause the different and distinct application to output the related content.

Figure 2G:
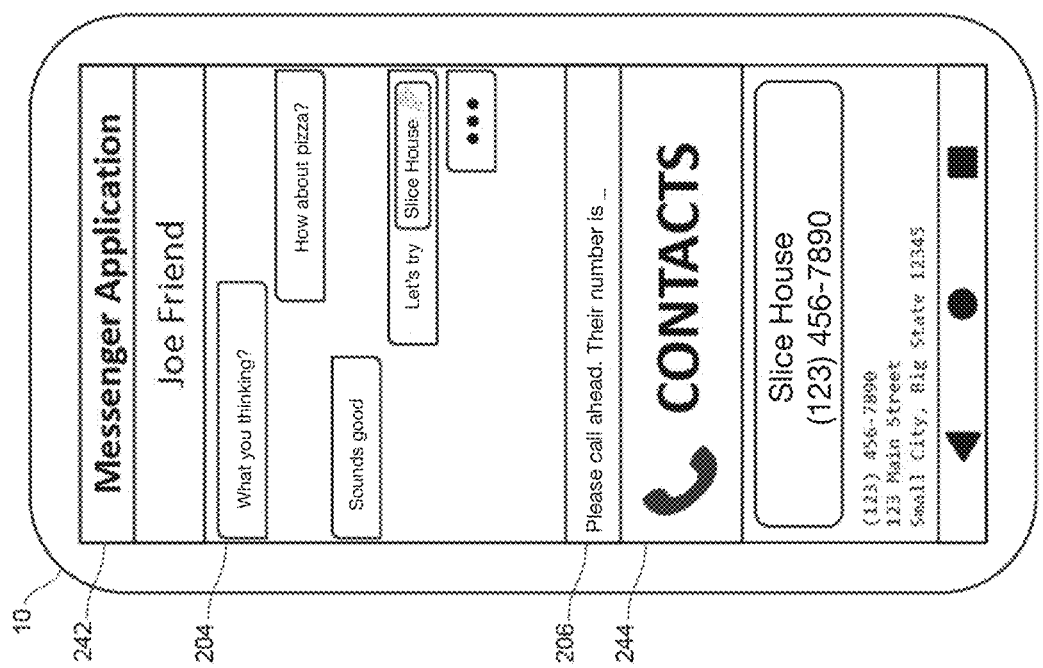

Based at least in part on such communication, computing device 10 can invoke the different and distinct application (e.g., the contact-management application, and/or the like), cause such application to output the related content, and/or the like. For example, referring to FIG. 2G, computing device 10 can generate data describing GUI 242, which can be presented by the display of computing device 10, and/or the like. GUI 242 can include element 244, which can be associated with the different and distinct application and/or include the related content (e.g., the portion of the text from the website pertaining to the restaurant, and/or the like).

Figure 2H:
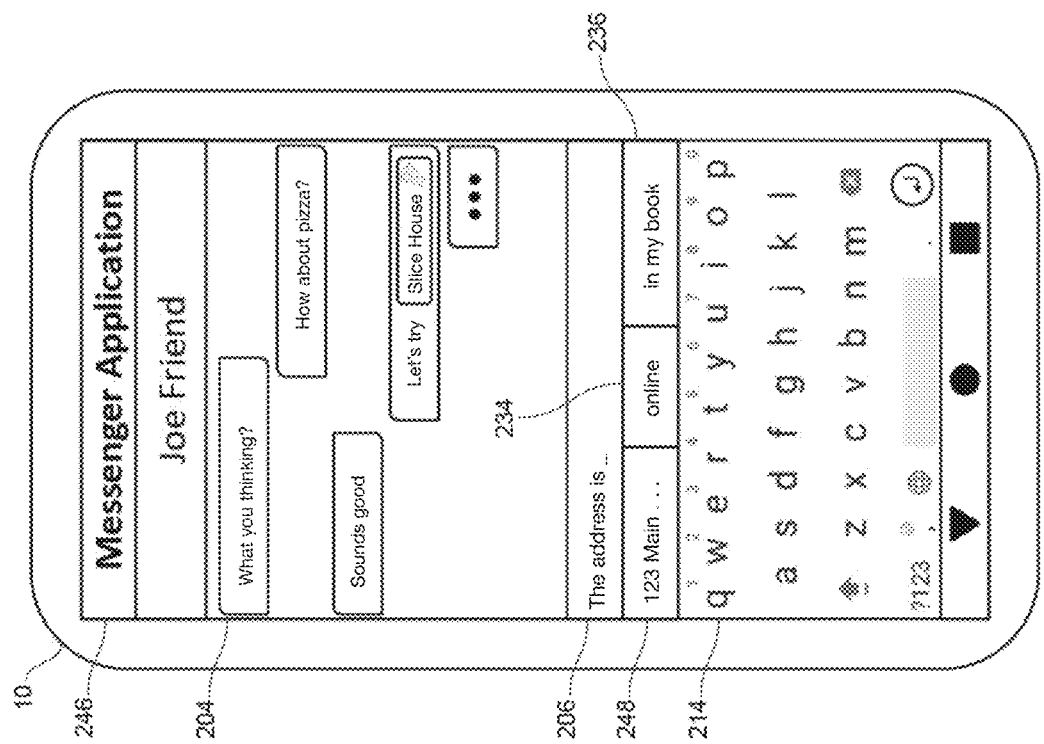

As previously indicated, in some embodiments, the suggested candidate input(s) can include a suggested candidate input comprising data configured in accordance with a predetermined format, and/or the like. For example, referring to FIG. 2H, the user of computing device 10 can utilize an application (e.g., the messaging application, and/or the like) associated with GUI 246 (e.g., to communicate with Joe Friend, and/or the like); computing device 10 can generate data describing GUI 246, which can be presented by the display of computing device 10, and/or the like; computing device 10 can receive data indicating information presented via element 204 of GUI 246 by the application associated with GUI 246 (e.g., "What you thinking?", "How about pizza?", "Sounds good," "Let's try Slice House," and/or the like) and/or data indicating information input via element 206 of GUI 246 into the application associated with GUI 246 (e.g., "The address is," and/or the like); and based at least in part on the data indicating the information presented via element 218 (e.g., the text from the website pertaining to the restaurant, and/or the like), the data indicating the information presented via element 204, and/or the data indicating the information input via element 206, computing device 10 can generate one or more suggested candidate inputs (e.g., "123 Main Street," "online," "in my book," and/or the like) that the user of computing device 10 may desire to input into the application associated with GUI 246 via a field corresponding to element 206 of GUI 246, and/or the like.

The generated suggested candidate input(s) can include a suggested candidate input (e.g., "123 Main Street," and/or the like) comprising data configured in accordance with a predetermined format (e.g., an address, and/or the like). The input interface provided by computing device 10 can include an option for selecting the suggested candidate input comprising the data configured in accordance with the predetermined format. For example, GUI 246 can include element 248, which can correspond to an option for selecting the suggested candidate input comprising the data configured in accordance with the predetermined format (e.g., "123 Main Street," and/or the like).

The user of computing device 10 can utilize the interface (e.g., invoke element 248, and/or the like) to select the suggested candidate input comprising the data configured in accordance with the predetermined format, and computing device 10 can receive data indicating the same. Responsive to receiving such data, computing device 10 can communicate, to the application associated with GUI 246 (e.g., by populating the field corresponding to element 206 with "123 Main Street," and/or the like), data indicating the suggested candidate input comprising the data configured in accordance with the predetermined format.

As previously indicated, in some embodiments, the suggested candidate input(s) can include a suggested candidate input comprising data configured to cause an application different and distinct from the application for which the suggested candidate input(s) were generated to output content related to the information presented by and/or input into the application(s) executed by computing device 10. In some of such embodiments, the different and distinct application can be executed by a computing device different and distinct from computing device 10.

Figure 2I:
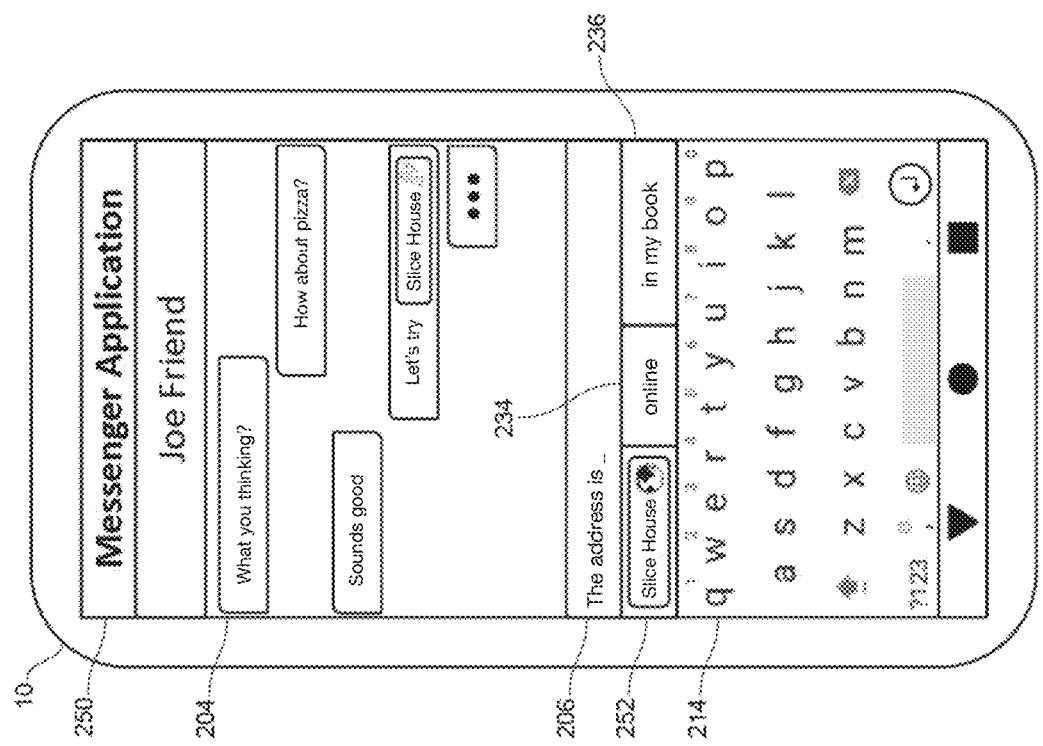

For example, referring to FIG. 2I, the user of computing device 10 can utilize an application (e.g., the messaging application, and/or the like) associated with GUI 250 (e.g., to communicate with Joe Friend, and/or the like); computing device 10 can generate data describing GUI 250, which can be presented by the display of computing device 10, and/or the like; computing device 10 can receive data indicating information presented via element 204 of GUI 250 by the application associated with GUI 250 (e.g., "What you thinking?", "How about pizza?", "Sounds good," "Let's try Slice House," and/or the like) and/or data indicating information input via element 206 of GUI 250 into the application associated with GUI 250 (e.g., "The address is," and/or the like); and based at least in part on the data indicating the information presented via element 218 (e.g., the text from the website pertaining to the restaurant, and/or the like), the data indicating the information presented via element 204, and/or the data indicating the information input via element 206, computing device 10 can generate one or more suggested candidate inputs that the user of computing device 10 may desire to input into the application associated with GUI 250 via a field corresponding to element 206 of GUI 250, and/or the like.

As previously indicated, computing device 10 can be different and distinct from computing device 20, which can, for example, be utilized by a different user (e.g., Joe Friend, and/or the like). The generated suggested candidate input(s) can include a suggested candidate input (e.g., data object, hyperlink, and/or the like) configured to cause an application (e.g., a mapping application, and/or the like) executed by computing device 20 to output content related to the information presented by and/or input into the application associated with GUI 250, for example, to output information (e.g., a map, and/or the like) based at least in part on the information presented via element 218 (e.g., the address included in the text from the website pertaining to the restaurant, and/or the like). The input interface provided by computing device 10 can include an option to select the suggested candidate input configured to cause the application executed by computing device 20 to output such content. For example, GUI 250 can include element 252, which can correspond to such an option. The user of computing device 10 can utilize the interface (e.g., invoke element 252, and/or the like) to select the suggested candidate input configured to cause the application executed by computing device 20 to output the related content, and computing device 10 can receive data indicating the same. Responsive to receiving such data, computing device 10 can communicate, to the application associated with GUI 250 (e.g., by populating the field corresponding to element 206 with the data object, hyperlink, and/or the like), data indicating the suggested candidate input configured to cause the application executed by computing device 20 to output the related content.

Figure 2J:
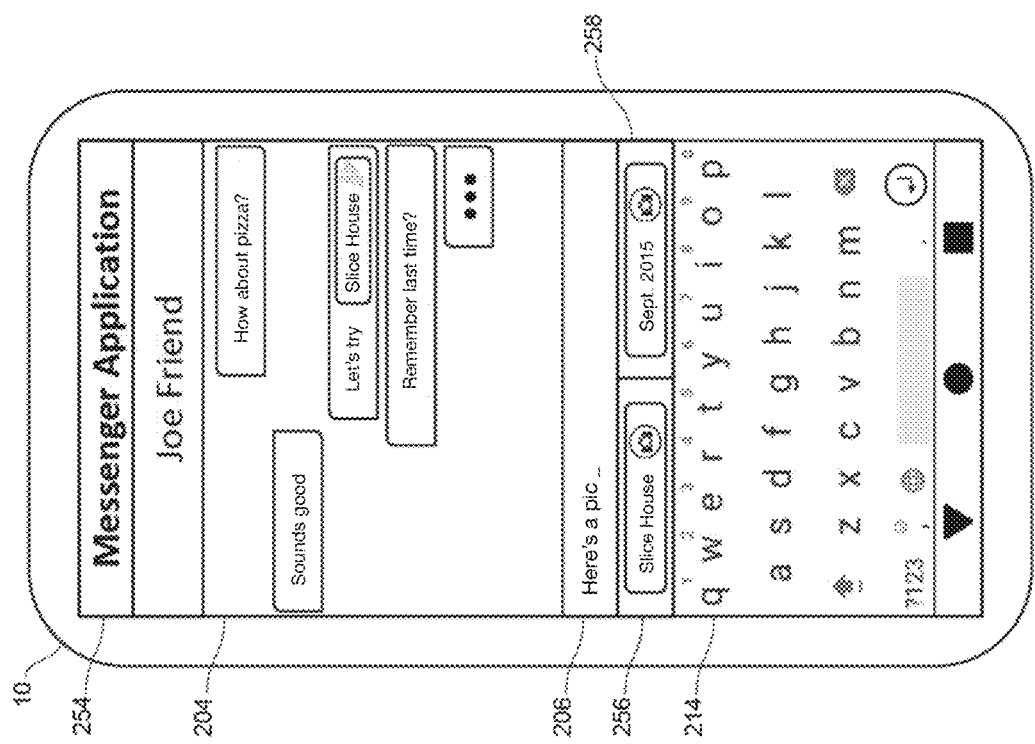

Additionally or alternatively, the different and distinct application can be executed by computing device 10. For example, referring to FIG. 2J, the user of computing device 10 can utilize an application (e.g., the messaging application, and/or the like) associated with GUI 254 (e.g., to communicate with Joe Friend, and/or the like); computing device 10 can generate data describing GUI 254, which can be presented by the display of computing device 10, and/or the like; computing device 10 can receive data indicating information presented via element 204 of GUI 254 by the application associated with GUI 254 (e.g., "How about pizza?", "Sounds good," "Let's try Slice House," "Remember last time?", and/or the like) and/or data indicating information input via element 206 of GUI 254 into the application associated with GUI 254 (e.g., "Here's a pic," and/or the like); and based at least in part on the data indicating the information presented via element 218 (e.g., the text from the website pertaining to the restaurant, and/or the like), the data indicating the information presented via element 204, and/or the data indicating the information input via element 206, computing device 10 can generate one or more suggested candidate inputs that the user of computing device 10 may desire to input into the application associated with GUI 254 via a field corresponding to element 206 of GUI 254, and/or the like.

The generated suggested candidate input(s) can include one or more suggested candidate inputs (e.g., data objects, hyperlinks, and/or the like) configured to cause a different and distinct application (e.g., a picture-management application, and/or the like) executed by computing device 10 to output content related to the information presented by and/or input into the application associated with GUI 254 (e.g., one or more pictures related to the messages communicated with Joe Friend, and/or the like). The input interface provided by computing device 10 can include one or more options to select the suggested candidate input(s) configured to cause the different and distinct application to output such content. For example, GUI 254 can include elements 256 and 258, which can correspond to such option(s). The user of computing device 10 can utilize the interface (e.g., invoke element 256, and/or the like) to select one of the suggested candidate input(s) configured to cause the different and distinct application to output the related content, and computing device 10 can receive data indicating the same. Responsive to receiving such data, computing device 10 can communicate (e.g., by populating the field corresponding to element 206 with the data object, hyperlink, and/or the like), data indicating the selected suggested candidate input configured to cause the different and distinct application to output the related content.

Figure 2K:
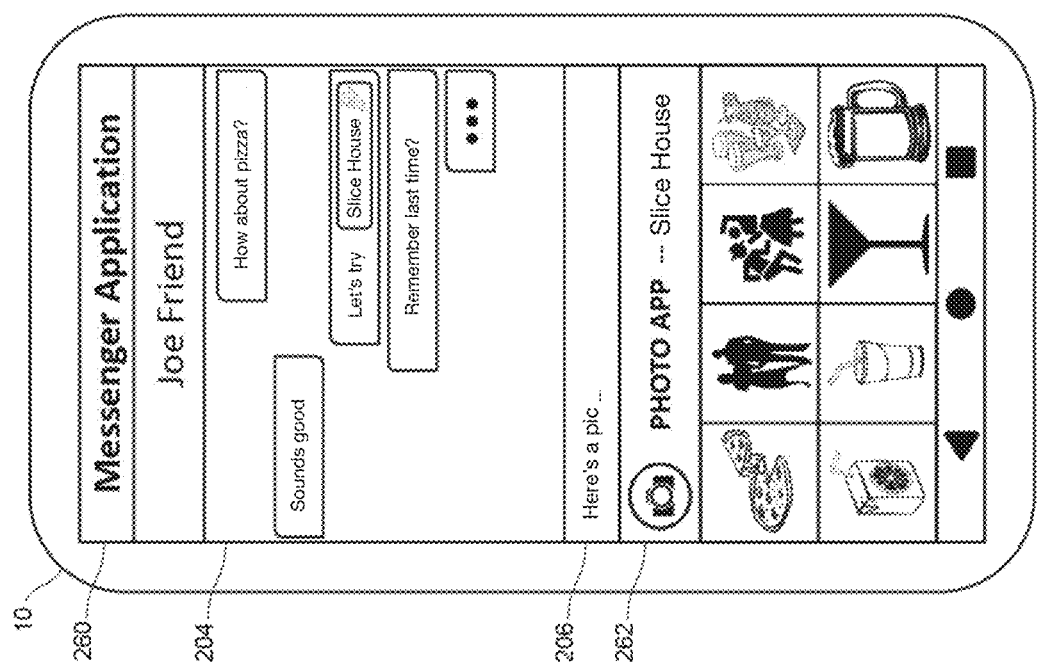

Based at least in part on such communication, computing device 10 can invoke the different and distinct application (e.g., the picture-management application, and/or the like), cause such application to output the related content, and/or the like. For example, referring to FIG. 2K, computing device 10 can generate data describing GUI 260, which can be presented by the display of computing device 10, and/or the like. GUI 260 can include element 262, which can be associated with the different and distinct application and/or include the related content (e.g., the picture(s) related to the messages communicated with Joe Friend, and/or the like).

Figure 2L:
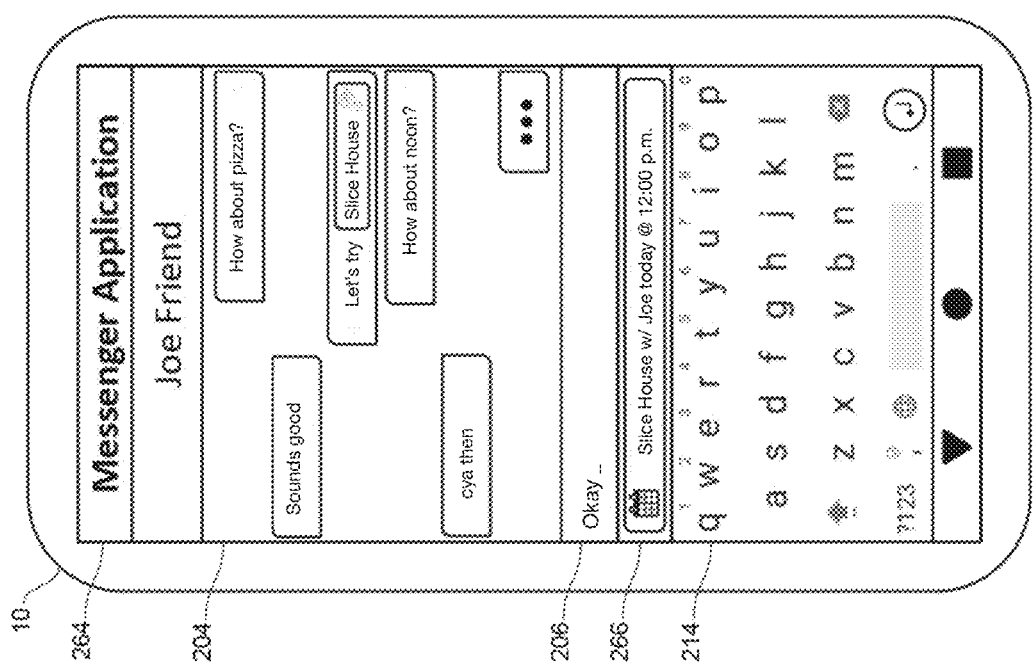

Similarly, referring to FIG. 2L, the user of computing device 10 can utilize an application (e.g., the messaging application, and/or the like) associated with GUI 264 (e.g., to communicate with Joe Friend, and/or the like); computing device 10 can generate data describing GUI 264, which can be presented by the display of computing device 10, and/or the like; computing device 10 can receive data indicating information presented via element 204 of GUI 264 by the application associated with GUI 264 (e.g., "How about pizza?", "Sounds good," "Let's try Slice House," "How about noon?", "cya then," and/or the like) and/or data indicating information input via element 206 of GUI 264 into the application associated with GUI 264 (e.g., "Okay," and/or the like); and based at least in part on the data indicating the information presented via element 218 (e.g., the text from the website pertaining to the restaurant, and/or the like), the data indicating the information presented via element 204, and/or the data indicating the information input via element 206, computing device 10 can generate one or more suggested candidate inputs that the user of computing device 10 may desire to input into the application associated with GUI 264 via a field corresponding to element 206 of GUI 264, and/or the like.

As previously indicated, the generated suggested candidate input(s) can include a suggested candidate input (e.g., data object, hyperlink, and/or the like) configured to cause a different and distinct application (e.g., a calendar application, and/or the like) executed by computing device 10 to output content related to the information presented by and/or input into the application associated with GUI 264 (e.g., a calendar entry for the planned lunch with Joe Friend at the restaurant, and/or the like). The input interface provided by computing device 10 can include an option to select the suggested candidate input configured to cause the different and distinct application to output such content. For example, GUI 264 can include element 266, which can correspond to such an option. The user of computing device 10 can utilize the interface (e.g., invoke element 266, and/or the like) to select the suggested candidate input configured to cause the different and distinct application to output the related content, and computing device 10 can receive data indicating the same. Responsive to receiving such data, computing device 10 can communicate (e.g., by populating the field corresponding to element 206 with the data object, hyperlink, and/or the like), data indicating the suggested candidate input configured to cause the different and distinct application to output the related content.

Figure 2M:
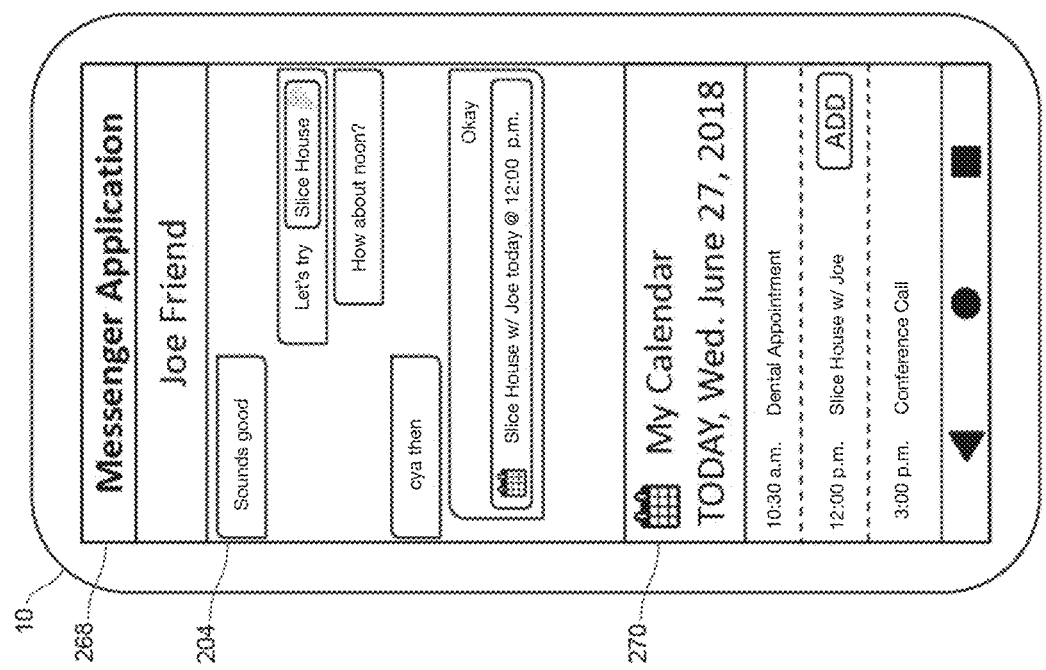

Based at least in part on such communication, computing device 10 can invoke the different and distinct application (e.g., the calendar application, and/or the like), cause such application to output the related content, and/or the like. For example, referring to FIG. 2M, computing device 10 can generate data describing GUI 268, which can be presented by the display of computing device 10, and/or the like. GUI 268 can include element 270, which can be associated with the different and distinct application and/or include the related content (e.g., the calendar entry for the planned lunch with Joe Friend at the restaurant, and/or the like).

As previously indicated, the user of computing device 10 can switch between the different and distinct application(s) executed by computing device 10, for example, to perform various functions with respect to an undertaken task, and/or the like. For example, referring to FIG. 2N, the user of computing device 10 (e.g., as the time for the scheduled lunch with Joe Friend approaches, and/or the like) can utilize an application (e.g., a car-service application, and/or the like) associated with GUI 272 (e.g., to request a car to travel to the lunch with Joe Friend, and/or the like); computing device 10 can generate data describing GUI 272, which can be presented by the display of computing device 10, and/or the like; computing device 10 can receive data indicating information presented via element 274 of GUI 272 by the application associated with GUI 272 (e.g., "<Enter a New Address Here>," and/or the like); and based at least in part on the data indicating the information presented via element 218 (e.g., the text from the website pertaining to the restaurant, and/or the like), data indicating information presented via element 270 (e.g., the calendar entry for the planned lunch with Joe Friend at the restaurant, and/or the like), the data indicating the information presented via element 274, the data indicating the information presented via element 204, and/or the data indicating the information input via element 206, computing device 10 can generate one or more suggested candidate inputs (e.g., "(Slice House) 123 Main Street, Small City, Big State 12345," "456 2nd St," and/or the like) that the user of computing device 10 may desire to input into the application associated with GUI 272 via a field corresponding to element 274 of GUI 272, and/or the like.

As previously indicated, in some embodiments, computing device 10 can determine (e.g., utilizing the ML model, and/or the like), for each of the suggested candidate input(s), a predicted likelihood that the user will select the suggested candidate input via the interface. In some of such embodiments, for each of one or more of the suggested candidate input(s), computing device 10 can determine the predicted likelihood that the user will select the suggested candidate input based at least in part on data identifying the application for which the suggested candidate input was generated, a selected input field of such application, and/or the like. For example, computing device 10 can determine there is a high likelihood the user of computing device 10 will select a particular suggested candidate input (e.g., "(Slice House) 123 Main Street, Small City, Big State 12345," and/or the like) based at least in part on data identifying the application associated with GUI 272 (e.g., the car-service application, and/or the like) and/or the field corresponding to element 274 (e.g., a destination-address field, and/or the like).

The input interface provided by computing device 10 can include one or more options to select at least one of the suggested candidate input(s). For example, GUI 272 can include elements 276 and 278, which can correspond to options for selecting one or more of the generated suggested candidate input(s) (e.g., "(Slice House) 123 Main Street, Small City, Big State 12345," "456 2nd St," and/or the like). The user of computing device 10 can utilize the interface to select one of the suggested candidate input(s), and computing device 10 can receive data indicating the same. For example, the user of computing device 10 can utilize the interface (e.g., invoke element 276, and/or the like) to select the suggested candidate input (e.g., "(Slice House) 123 Main Street, Small City, Big State 12345," and/or the like) corresponding to element 276, and computing device 10 can receive data indicating the selected suggested candidate input. Responsive to receiving such data, computing device 10 can communicate data indicating the selected suggested candidate input to the application. For example, responsive to receiving the data indicating the user of computing device 10 has selected the suggested candidate input (e.g., "(Slice House) 123 Main Street, Small City, Big State 12345," and/or the like) corresponding to element 276, computing device 10 can communicate data indicating the selected suggested candidate input to the application associated with GUI 272 (e.g., by populating the field corresponding to element 274 with "(Slice House) 123 Main Street, Small City, Big State 12345," and/or the like).

FIGS. 3A-D depict additional example GUIs according to example embodiments of the present disclosure.

Figure 3A:
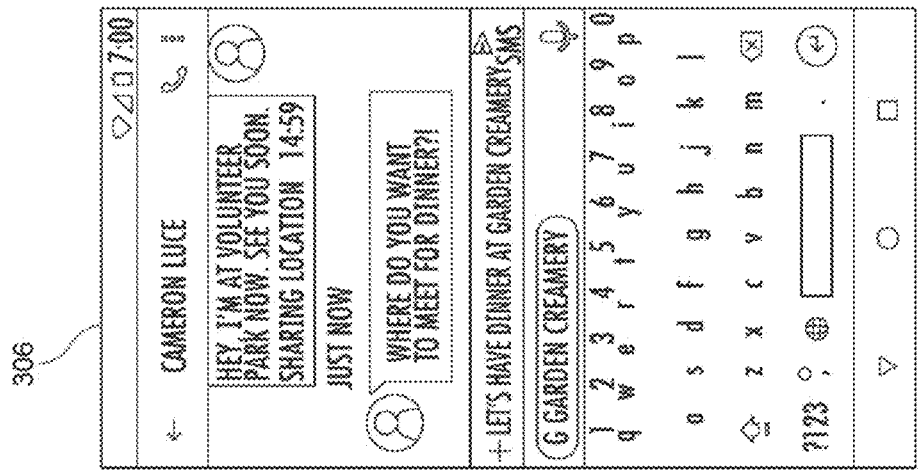
Figure 3A:
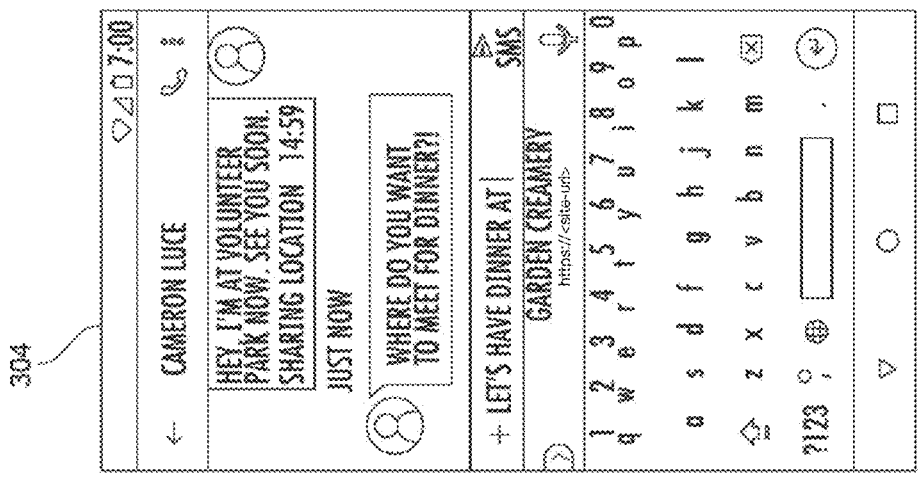
Figure 3A:
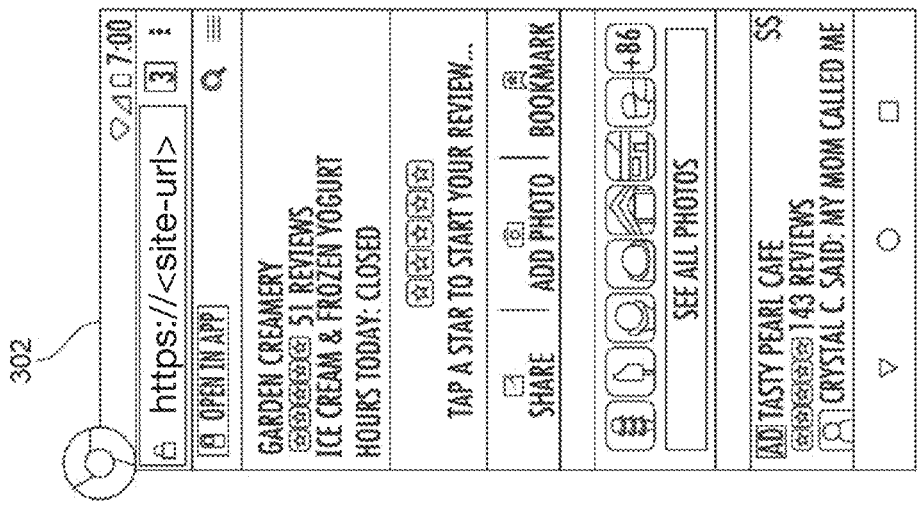

Referring to FIG. 3A, GUIs 302, 304, and 306 illustrate an example use case. For example, GUI 302 depicts an example of a user utilizing a web-browser application (e.g., to research a restaurant, and/or the like); GUI 304 depicts an example of the user being provided, in association with a messenger application, an interface that includes an option for selecting a suggested candidate input, for example, referencing information presented via the web-browser application (e.g., from a website pertaining to the restaurant, and/or the like), generated based at least in part on information presented by and/or input into the web-browser application (e.g., "GARDEN CREAMERY," and/or the like) and/or information presented by and/or input into the messenger application (e.g., "LET'S HAVE DINNER AT," and/or the like); and GUI 306 depicts an example of the user being provided, in association with the messenger application, an interface that includes an option for selecting a suggested candidate input configured to cause a different and distinct application (e.g., a web-browser application executed by a computing device of "CAMERON LUCE," and/or the like) to output content (e.g., the website pertaining to the restaurant, and/or the like) related to the information presented by and/or input into the web-browser and/or messenger application(s) executed by the computing device(s) of the user.

Figure 3B:
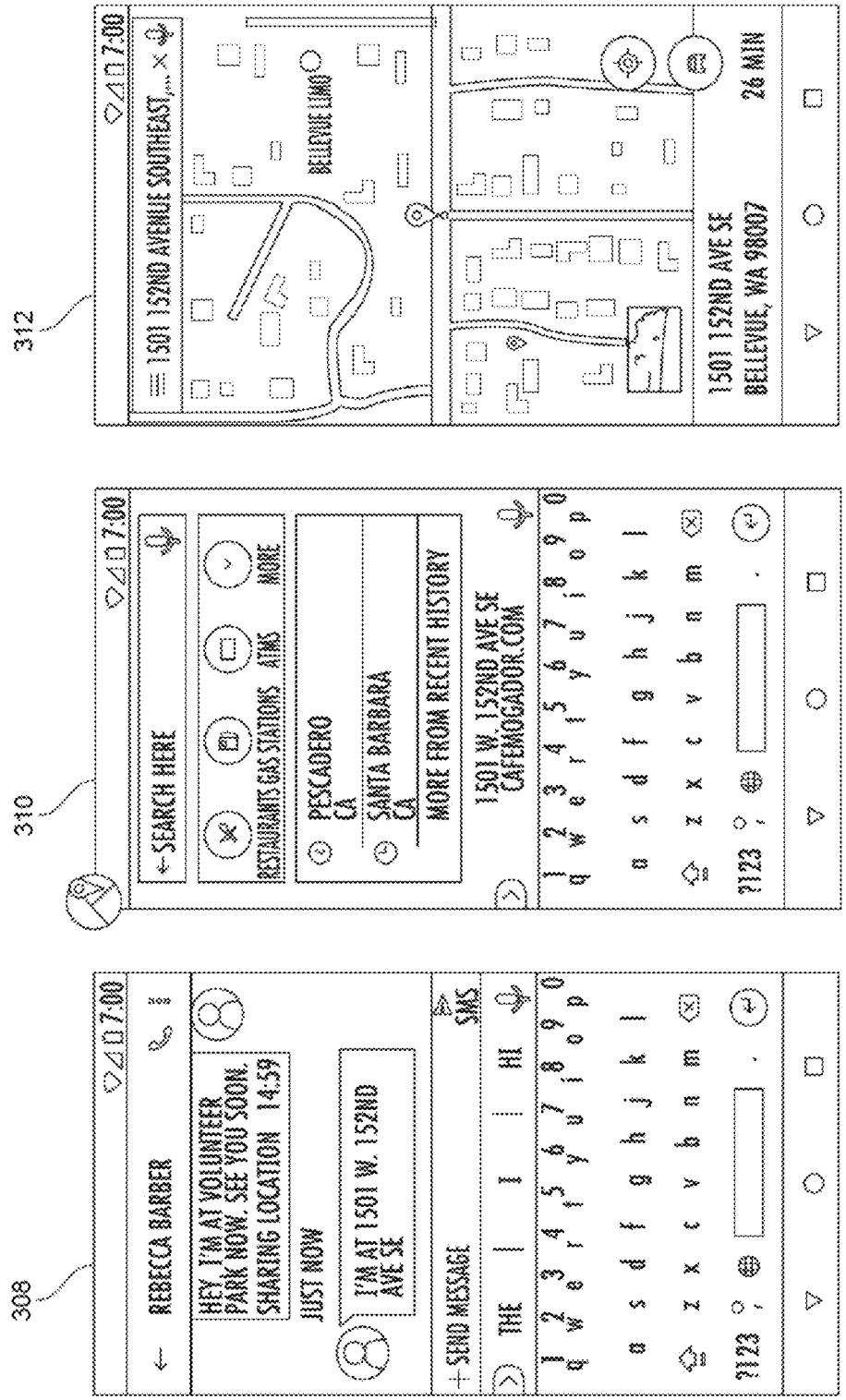

Referring to FIG. 3B, GUIs 308, 310, and 312 illustrate an additional example use case. For example, GUI 308 depicts an example of a user utilizing a messenger application (e.g., to communicate with "REBECCA BARBER," and/or the like); GUI 310 depicts an example of the user being provided, in association with a mapping application, an interface that includes an option for selecting a suggested candidate input, for example, referencing information presented via the messenger application (e.g., an address, and/or the like), generated based at least in part on information presented by and/or input into the messenger application (e.g., "I'M AT 1501 W. 152ND AVE SE," and/or the like) and/or information presented by and/or input into the mapping application (e.g., "SEARCH HERE," and/or the like); and GUI 312 depicts an example of the mapping application outputting content (e.g., a map of the area referenced by the address, and/or the like) related to the information presented by and/or input into the messenger and/or mapping application(s).

Figure 3C:
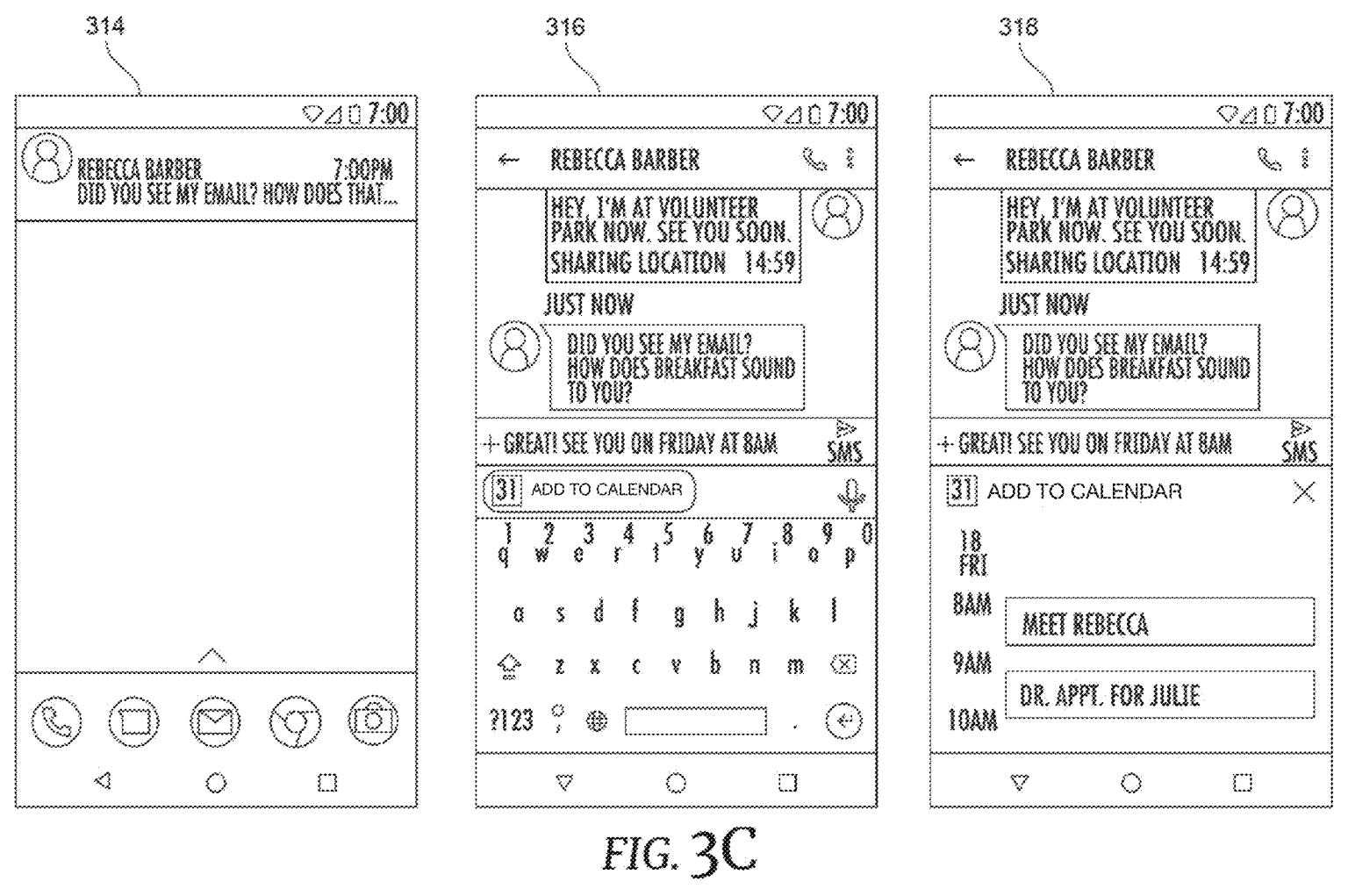

Referring to FIG. 3C, GUIs 314, 316, and 318 illustrate a further example use case. For example, GUI 314 depicts an example of a user being presented (e.g., in association with a home screen, and/or the like) with a notification of a messenger application (e.g., regarding a message from "REBECCA BARBER," and/or the like); GUI 316 depicts an example of the user being provided, in association with the messenger application, an interface that includes an option for selecting a suggested candidate input, for example, generated based at least in part on information presented by and/or input into the messenger application (e.g., "REBECCA BARBER," "SEE YOU ON FRIDAY AT 8 AM," and/or the like) and/or configured to cause a different and distinct application (e.g., a calendar application, and/or the like) to output content (e.g., an option to create a new calendar entry, and/or the like) related to the information presented by and/or input into the messenger application; and GUI 318 depicts an example of the calendar application being presented in association with the messenger application and outputting the content (e.g., the option to create the new calendar entry, and/or the like) related to the information presented by and/or input into the messenger application.

Figure 3D:
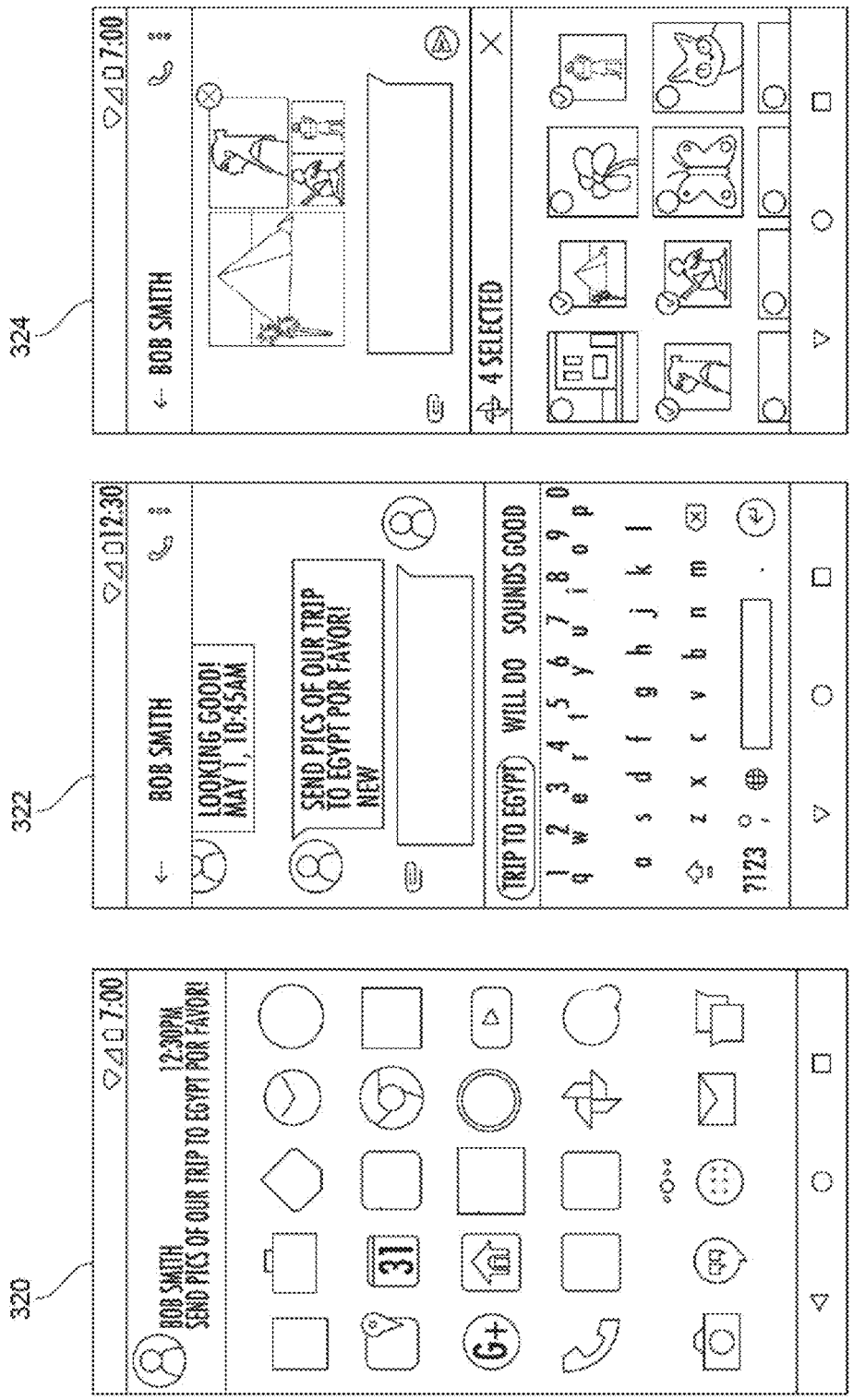

Referring to FIG. 3D, GUIs 320, 322, and 324 illustrate a further example use case. For example, GUI 320 depicts an example of a user being presented (e.g., in association with a home screen, and/or the like) with a notification of a messenger application (e.g., regarding a message from "BOB SMITH," and/or the like); GUI 322 depicts an example of the user being provided, in association with the messenger application, an interface that includes an option for selecting a suggested candidate input, for example, generated based at least in part on information presented by and/or input into the messenger application (e.g., "SEND PICS OF OUR TRIP TO EGYPT POR FAVOR!," and/or the like) and/or configured to cause a different and distinct application (e.g., a picture-management application, and/or the like) to output content (e.g., pictures from an album entitled "TRIP TO EGYPT," and/or the like) related to the information presented by and/or input into the messenger application; and GUI 324 depicts an example of the picture-management application being presented in association with the messenger application and outputting the content (e.g., the pictures from the album entitled "TRIP TO EGYPT," and/or the like) related to the information presented by and/or input into the messenger application.

Figure 4:
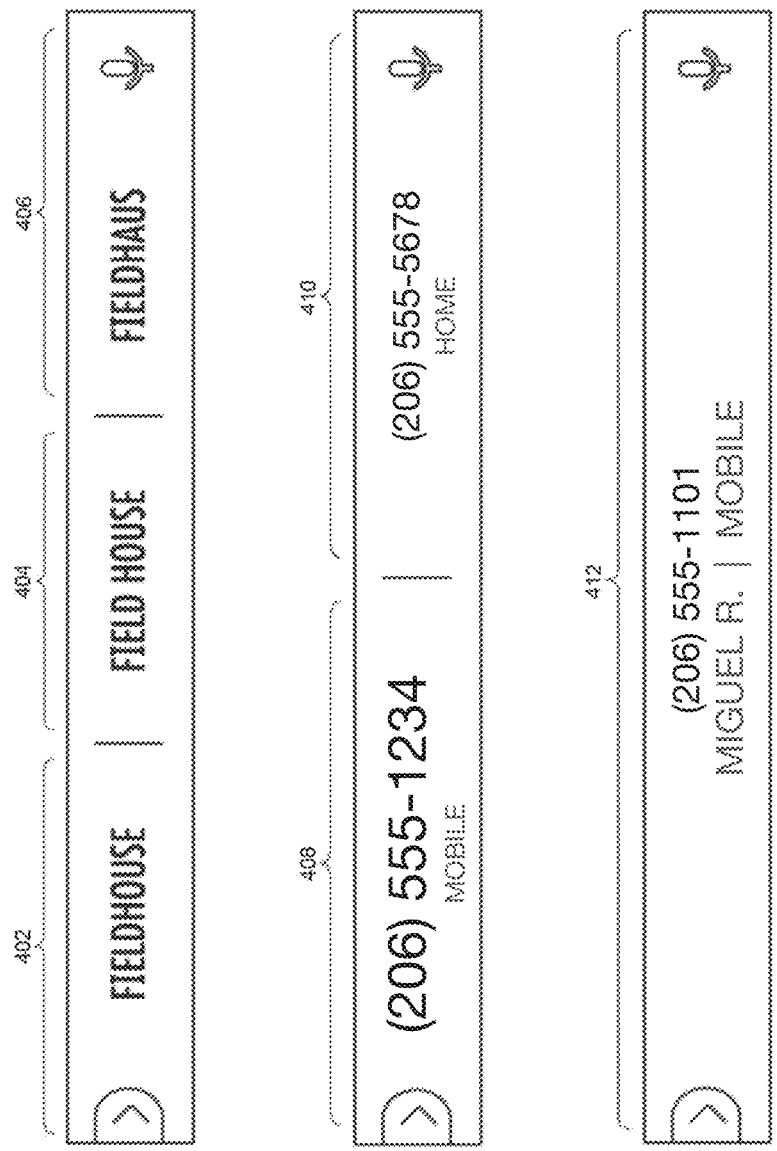
FIG. 4 depicts example GUI elements according to example embodiments of the present disclosure.

FIG. 4 depicts example GUI elements according to example embodiments of the present disclosure.

Referring to FIG. 4, as previously indicated, in some embodiments, computing device 10 can determine (e.g., utilizing the ML model, and/or the like), for each of the suggested candidate input(s), a predicted likelihood that the user will select the suggested candidate input via the interface. In some of such embodiments, for one or more of the suggested candidate input(s) (e.g., the suggested candidate input(s) for which selection option(s) will be included in the interface, and/or the like), computing device 10 can determine one or more prominences within the interface of one or more of the option(s) for selecting the suggested candidate input(s) based at least in part on the likelihood that the user will select the suggested candidate input(s).

For example, elements 402, 404, 406, 408, 410, and 412 can correspond to options for selecting various different suggested candidate inputs (e.g., "FIELDHOUSE," "FIELD HOUSE," "FIELDHAUS," "(206) 555-1234," "(206) 555-5678," "(206) 555-1101," and/or the like). Computing device 10 can determine one or more sizes of element(s) 402, 404, 406, 408, 410, and/or 412 based at least in part on the likelihood that the user will select their corresponding suggested candidate input(s). In some embodiments, computing device 10 can determine an element (e.g., element 412, and/or the like) corresponding to a suggested candidate input with a higher likelihood of being selected should have a larger size than an element (e.g., element 408, and/or the like) corresponding to a suggested candidate input with a lower likelihood of being selected, and/or the like. Similarly, computing device 10 can determine an element (e.g., element 408, and/or the like) corresponding to a suggested candidate input with a higher likelihood of being selected should have a larger size font than an element (e.g., element 410, and/or the like) corresponding to a suggested candidate input with a lower likelihood of being selected, and/or the like.

Additionally or alternatively, computing device 10 can determine a number of elements (e.g., corresponding to one or more other (or alternative) suggested candidate inputs, and/or the like) to be presented alongside an element based at least in part on the likelihood that the user will select the suggested candidate input corresponding to the element. For example, in some embodiments, computing device 10 can determine to present fewer elements (e.g., element 410, and/or the like) alongside an element (e.g., element 408, and/or the like) corresponding to a suggested candidate input with a higher likelihood of being selected in comparison with a number of elements (e.g., elements 404, 406, and/or the like) determined by computing device 10 to be presented alongside an element (e.g., element 402, and/or the like) corresponding to a suggested candidate input with a lower likelihood of being selected, and/or the like.

Figure 5:
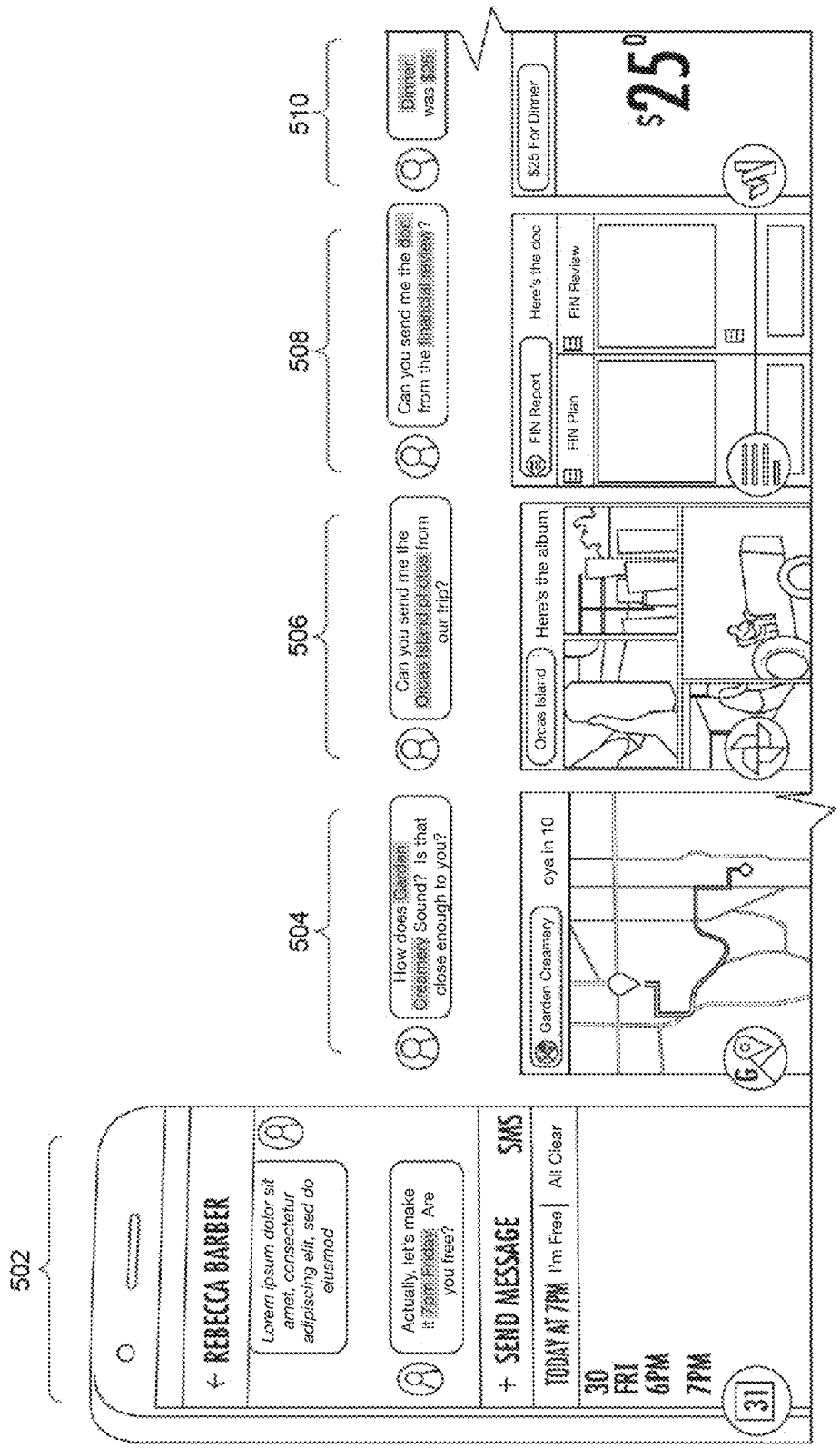
FIG. 5 depicts example use cases according to example embodiments of the present disclosure.

FIG. 5 depicts example use cases according to example embodiments of the present disclosure.

Referring to FIG. 5, scene 502 depicts an example of a user utilizing a messenger application (e.g., to communicate with "REBECCA BARBER," and/or the like) and a calendar application (e.g., to check their availability, and/or the like). As illustrated, the user can be provided, in association with the messenger application, an interface that includes one or more options for selecting one or more suggested candidate inputs (e.g., "I'm Free," "All Clear," and/or the like), for example, generated based at least in part on information presented by and/or input into the messenger application (e.g., "Actually, let's make it 7 pm Friday," and/or the like) and/or information presented by and/or input into the calendar application (e.g., "FRI," "7 PM," <no calendar entry>, and/or the like).

Scene 504 depicts an example of a user utilizing a messenger application and a mapping application (e.g., to check the location of "Garden Creamery," and/or the like). As illustrated, the user can be provided, in association with the messenger application, an interface that includes one or more options for selecting one or more suggested candidate inputs (e.g., "cya in 10," and/or the like), for example, generated based at least in part on information presented by and/or input into the messenger application (e.g., "How does Garden Creamery Sound? Is that close enough to you?", and/or the like) and/or information presented by and/or input into the mapping application (e.g., the distance from the user's current location to "Garden Creamery," and/or the like).

Scene 506 depicts an example of a user utilizing a messenger application and a picture-management application (e.g., to select one or more pictures for communication via the messenger application, and/or the like). As illustrated, the user can be provided, in association with the messenger application, an interface that includes one or more options for selecting one or more suggested candidate inputs (e.g., "Orcas Island," "Here's the album," and/or the like), for example, generated based at least in part on information presented by and/or input into the messenger application (e.g., "Can you send me the Orcas Island photos from our trip?", and/or the like) and/or information presented by and/or input into the picture-management application (e.g., selection of one or more photos, and/or the like). As previously indicated, one or more of the suggested candidate input(s) (e.g., "Orcas Island," and/or the like) for the messenger application can comprise data configured to cause a different and distinct application (e.g., the picture-management application, an application comprising an interface for selecting pictures managed by the picture-management application, and/or the like) to output content (e.g., one or more photos from an album corresponding to "Orcas Island" for selection, and/or the like) related to the information presented by and/or input into the messenger application. For example, the interface for the picture-management application can be provided in association with the messenger application in response to the user invoking such an option.

Scene 508 depicts an example of a user utilizing a messenger application and a document-management application (e.g., to select one or more documents for communication via the messenger application, and/or the like). As illustrated, the user can be provided, in association with the messenger application, an interface that includes one or more options for selecting one or more suggested candidate inputs (e.g., "FIN Report," "Here's the doc," and/or the like), for example, generated based at least in part on information presented by and/or input into the messenger application (e.g., "Can you send me the doc from the financial review?", and/or the like) and/or information presented by and/or input into the document-management application (e.g., selection of one or more documents, and/or the like). As previously indicated, one or more of the suggested candidate input(s) (e.g., "FIN Report," and/or the like) for the messenger application can comprise data configured to cause a different and distinct application (e.g., the document-management application, an application comprising an interface for selecting documents managed by the document-management application, and/or the like) to output content (e.g., one or more documents corresponding to "FIN Report" for selection, and/or the like) related to the information presented by and/or input into the messenger application. For example, the interface for the document-management application can be provided in association with the messenger application in response to the user invoking such an option.

Scene 510 depicts an example of a user utilizing a messenger application and an electronic-payment application (e.g., to send a payment to an individual being communicated with via the messenger application, and/or the like). As illustrated, the user can be provided, in association with the messenger application, an interface that includes one or more options for selecting one or more suggested candidate inputs (e.g., "$25 For Dinner," and/or the like), for example, generated based at least in part on information presented by and/or input into the messenger application (e.g., "Dinner was $25," and/or the like). As previously indicated, one or more of the suggested candidate input(s) (e.g., "$25 For Dinner," and/or the like) for the messenger application can comprise data configured to cause a different and distinct application (e.g., the electronic-payment application, an application comprising an interface for controlling the electronic-payment application, and/or the like) to output content (e.g., an option to send the payment to the individual for selection, and/or the like) related to the information presented by and/or input into the messenger application. For example, the interface for the electronic-payment application can be provided in association with the messenger application in response to the user invoking such an option.

Figure 6:
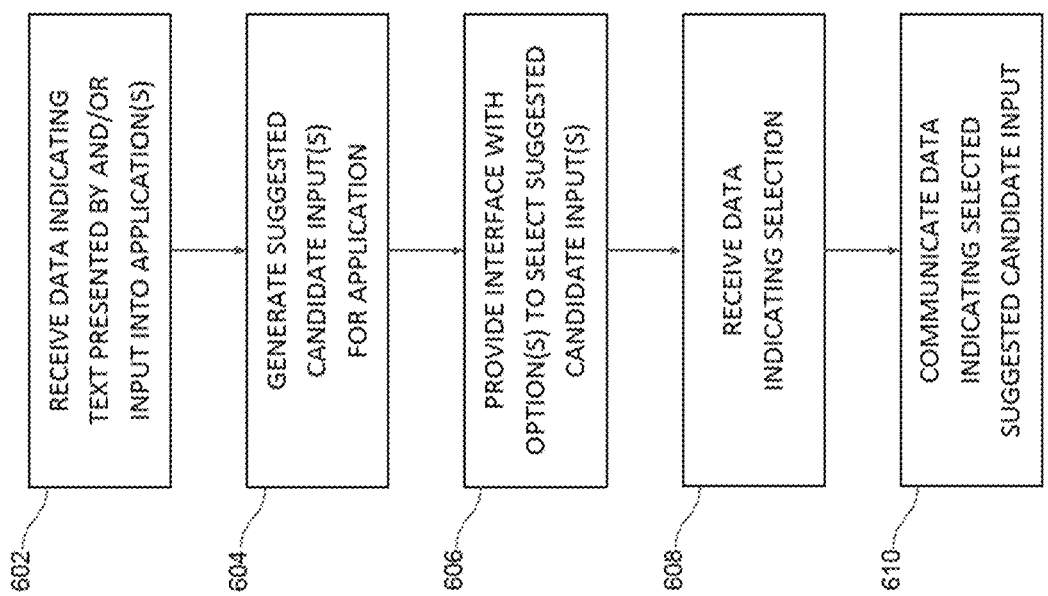
FIG. 6 depicts an example method according to example embodiments of the present disclosure.

FIG. 6 depicts an example method according to example embodiments of the present disclosure.

Referring to FIG. 6, at (602), one or more computing devices can receive data indicating information presented by and/or input into one or more applications executed by the computing device(s). For example, computing device 10 can receive data indicating information presented via elements 204 and/or 218, input via element 206, and/or the like.

At (604), the computing device(s) can generate, based at least in part on the data indicating the information presented by and/or input into the application(s), one or more suggested candidate inputs for an application executed by the computing device(s). For example, based at least in part on the data indicating the information presented via elements 204 and/or 218, input via element 206, and/or the like, computing device 10 can generate one or more suggested candidate inputs (e.g., "Slice House," "not to," and/or the like) for the application associated with GUI 220, and/or the like.

At (606), the computing device(s) can provide, in association with the application for which the suggested candidate input(s) were generated, an interface that includes one or more options to select at least one of the suggested candidate input(s). For example, computing device 10 can generate data describing GUI 220, which can include elements 222 and 224, can be presented by the display of computing device 10, and/or the like.

At (608), the computing device(s) can receive data indicating a selection of one of the suggested candidate input(s). For example, computing device 10 can receive data indicating selection of the suggested candidate input (e.g., "Slice House," and/or the like) corresponding to element 222, and/or the like.

At (610), the computing device(s) can communicate, to the application for which the suggested candidate input(s) were generated, data indicating the selected suggested candidate input. For example, computing device 10 can communicate data indicating the selected suggested candidate input to the application associated with GUI 220 (e.g., by populating the field corresponding to element 206 with "Slice House," and/or the like).

The technology discussed herein makes reference to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein can be implemented using a single device or component and/or multiple devices or components working in combination. Databases and/or applications can be implemented on a single system and/or distributed across multiple systems. Distributed components can operate sequentially and/or in parallel.

Various connections between elements are discussed in the above description. These connections are general and, unless specified otherwise, can be direct and/or indirect, wired and/or wireless. In this respect, the specification is not intended to be limiting.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method comprising:
   executing, by one or more computing devices, a first application;
   receiving, by the one or more computing devices and from the first application executed by the one or more computing devices, data indicating information that has been one or more of presented by or input into the first application;
   executing, by the one or more computing devices, a second application that is different and distinct from the first application;
   determining, by the one or more computing devices based at least in part on one or more functions of the second application, a subset of information from the information that has been one or more of presented by or input into the first application;
   in response to executing the second application and determining the subset of information, automatically generating, by the one or more computing devices, based at least in part on the subset of information, one or more suggested candidate inputs for one or more input fields associated with the second application;
   displaying, by the one or more computing devices and concurrently with display of the second application, an interface comprising one or more options to select at least one suggested candidate input of the one or more suggested candidate inputs for entry into at least one of the one or more input fields associated with the second application; and
   responsive to receiving data indicating a selection of a particular suggested candidate input of the one or more suggested candidate inputs via the interface; communicating; by the one or more computing devices and to the second application, data indicating the particular suggested candidate input selected for entry into at least one of the one or more input fields associated with the second application.

2. The computer-implemented method of claim 1, wherein generating the one or more suggested candidate inputs comprises generating the one or more suggested candidate inputs based at least in part on the subset of information.

3. The computer-implemented method of claim 1, wherein receiving the data indicating the information comprises receiving the data indicating the information via a device-accessibility application programming interface (API) of the one or more computing devices.

4. The computer-implemented method of claim 1, wherein receiving the data indicating the information comprises:
   communicating, by the first application, the data indicating the information via an application programming interface (API) of the one or more computing devices configured to manage a file-based application-indexing log stored on the one or more computing devices and comprising data indicating one or more application actions or events; and
   retrieving the data indicating the information from the file-based application-indexing log via the API.

5. The computer-implemented method of claim 1, comprising:
   utilizing, by the one or more computing devices, a machine learning (ML) model to determine, for each suggested candidate input of the one or more suggested candidate inputs, a predicted likelihood that a user will select the suggested candidate input via the interface; and
   determining, by the one or more computing devices, for each suggested candidate input of the at least one suggested candidate input, and based at least in part on the predicted likelihood that the user will select the suggested candidate input via the interface, to include an option in the interface for selecting the suggested candidate input.

6. The computer-implemented method of claim 5, comprising, for at least one suggested candidate input of the one or more suggested candidate inputs:
   annotating, by the one or more computing devices, the suggested candidate input with metadata determined based at least in part on one or more of:
      a portion of the information,
      factual knowledge about the user, or
      factual knowledge about a physical environment in which the one or more computing devices are located; and
   determining, by the one or more computing devices and based at least in part on the metadata, the predicted likelihood that the user will select the suggested candidate input via the interface.

7. The computer-implemented method of claim 5, comprising, for at least one suggested candidate input of the one or more suggested candidate inputs:
   generating, by the one or more computing devices, one or more numeric descriptions of one or more features of the suggested candidate input distinct from its content; and
   determining, by the one or more computing devices and based at least in part on the one or more numeric descriptions, the predicted likelihood that the user will select the suggested candidate input via the interface.

8. The computer-implemented method of claim 7, wherein, for at least one suggested candidate input of the one or more suggested candidate inputs, the one or more features comprise one or more of how recently or how frequently the content of the suggested candidate input was presented by the one or more computing devices.

9. The computer-implemented method of claim 7, wherein, for at least one suggested candidate input of the one or more suggested candidate inputs, the one or more features comprise a type of societal entity associated with the suggested candidate input.

10. The computer-implemented method of claim 5, comprising determining, by the one or more computing devices and for at least one suggested candidate input of the one or more suggested candidate inputs, the predicted likelihood that the user will select the suggested candidate input based at least in part on the subset of information.

11. The computer-implemented method of claim 5, comprising updating; by the one or more computing devices, the ML model based at least in part on data generated by a plurality of different computing devices via a federated-learning paradigm.

12. The computer-implemented method of claim 5, comprising generating, by the one or more computing devices and for at least one suggested candidate input of the one or more suggested candidate inputs, a training record for the ML model based at least in part on one or more numeric descriptions of one or more features of the suggested candidate input distinct from its content.

13. The computer-implemented method of claim 5, comprising generating, by the one or more computing devices and for at least one suggested candidate input of the one or more suggested candidate inputs, a training record for the ML model based at least in part on a determination that the user manually input data corresponding to content of the suggested candidate input in lieu of selecting the suggested candidate input via the interface.

14. The computer-implemented method of claim 1, wherein:
displaying the interface comprises generating a graphical user interface (GUI) comprising one or more elements corresponding to the one or more options to select the at least one suggested candidate input; and
the method comprises:
determining, by the one or more computing devices, a predicted likelihood that a user will select the particular suggested candidate input via the interface; and
determining, by the one or more computing devices and based at least in part on the predicted likelihood, one or more of:
a size of an element, of the one or more elements, corresponding to an option, of the one or more options, to select the particular suggested candidate input; or
a number of the one or more elements, corresponding to one or more of the one or more options to select one or more other suggested candidate inputs of the at least one suggested candidate input, to be presented alongside the element corresponding to the option to select the particular suggested candidate input.

15. A system comprising:
one or more processors; and
a memory storing instructions that when executed by one or more processors cause the system to perform operations comprising;
executing a first application;
receiving data indicating information that has been presented by the first application executed by the system;
executing a second application that is different and distinct from the first application;
receiving data indicating information that has been input into a second application executed by the system, the second application being different and distinct from the first application;
determining, based at least in part on one or more functions of the second application, a subset of information from the information that has been presented by the first application and the information that has been input into the second application executed by the system;
in response to executing the second application and determining the subset of information, automatically generating, based at least in part on the subset of information, one or more suggested candidate inputs for one or more input fields associated with the second application;
displaying, concurrently with display of the second application, an interface comprising one or more options to select at least one suggested candidate input of the one or more suggested candidate inputs for entry into at least one of the one or more input fields associated with the second application; and
responsive to receiving data indicating a selection of a particular suggested candidate input of the one or more suggested candidate inputs via the interface, communicating, to the second application, data indicating the particular suggested candidate input selected for entry into at least one of the one or more input fields associated with the second application.

16. The system of claim 15, wherein the operations comprise:
utilizing a machine learning (ML) model to determine, for each suggested candidate input of the one or more suggested candidate inputs, a predicted likelihood that a user will select the suggested candidate input via the interface; and
determining, for each suggested candidate input of the at least one suggested candidate input and based at least in part on the predicted likelihood that the user will select the suggested candidate input via the interface, to include an option in the interface for selecting the suggested candidate input.

17. The system of claim 16, wherein the operations comprise, for each suggested candidate input of the one or more suggested candidate inputs:
generating one or more numeric descriptions of one or more features of the suggested candidate input distinct from its content; and
determining, based at least in part on the one or more numeric descriptions, the predicted likelihood that the user will select the suggested candidate input via the interface.

18. One or more non-transitory computer-readable media comprising instructions that when executed by one or more computing devices cause the one or more computing devices to perform operations comprising:
executing a first application;
receiving data indicating information that has been one or more of presented by or input into the first application executed by the one or more computing devices;
executing a second application that is different and distinct from the first application;
receiving data indicating information that has been input into a second application executed by the one or more computing devices, the second application being different and distinct from the first application;
determining, based at least in part on one or more functions of the second application, a subset of information from the information that has been one or more of presented by or input into the first application and the information that has been input into the second application executed by the system;
in response to executing the second application and determining the subset of information, automatically generating, based at least in part on the subset of information, one or more suggested candidate inputs for one or more fields associated with the second application including a suggested candidate input comprising metadata determined based at least in part on an entity associated with the suggested candidate input; and displaying, concurrently with display of the second application executed by the one or more computing devices, an interface comprising one or more options to select at least one suggested candidate input of the one or more suggested candidate inputs including the suggested candidate input comprising the metadata determined based at least in part on the entity associated with the suggested candidate input for entry into at least one of the one or more input fields associated with the second application.

19. The one or more non-transitory computer-readable media of claim 18, wherein the suggested candidate input comprising the metadata comprises data configured to cause a different and distinct application to output content related to the subset of information.

20. The one or more non-transitory computer-readable media of claim 18, wherein:

displaying the interface comprises generating a graphical user interface (GUI) comprising one or more elements corresponding to the one or more options to select the at least one suggested candidate input; and the operations comprise:
 determining a predicted likelihood that a user will select the suggested candidate input comprising the metadata via the interface; and
 determining, based at least in part on the predicted likelihood, one or more of:
  a size of an element, of the one or more elements, corresponding to an option, of the one or more options, to select the suggested candidate input comprising the metadata; or
  a number of the one or more elements, corresponding to one or more of the one or more options to select one or more other suggested candidate inputs of the at least one suggested candidate input, to be presented alongside the element corresponding to the option to select the suggested candidate input comprising the metadata.

* * * * *